United States Patent
Braunstein

(10) Patent No.: US 12,124,266 B2
(45) Date of Patent: Oct. 22, 2024

(54) BATTERY SUPPORT SERVICE VEHICLE

(71) Applicant: Caterpillar Inc., Peoria, IL (US)

(72) Inventor: Michael Dennis Braunstein, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 39 days.

(21) Appl. No.: 17/537,331

(22) Filed: Nov. 29, 2021

(65) Prior Publication Data

US 2023/0168684 A1    Jun. 1, 2023

(51) Int. Cl.
| | | |
|---|---|---|
| G05D 1/00 | (2024.01) | |
| B60L 53/12 | (2019.01) | |
| B60L 53/80 | (2019.01) | |
| B60L 58/12 | (2019.01) | |
| G01C 1/00 | (2006.01) | |
| G01C 21/34 | (2006.01) | |

(52) U.S. Cl.
CPC ............ *G05D 1/0225* (2013.01); *B60L 53/80* (2019.02); *B60L 58/12* (2019.02); *G01C 21/3407* (2013.01); *G05D 1/12* (2013.01)

(58) Field of Classification Search
CPC ............ G05D 1/0225; G05D 1/12; G05D 2201/0207; B60L 53/80; B60L 58/12; G01C 21/3407
See application file for complete search history.

(56) References Cited

U.S. PATENT DOCUMENTS

| | | | |
|---|---|---|---|
| 7,841,433 B2 | 11/2010 | Soliman et al. | |
| 8,360,343 B2 | 1/2013 | Gudat et al. | |
| 8,543,272 B2 | 9/2013 | Yu et al. | |
| 8,983,657 B2 | 3/2015 | Jacobson | |
| 8,983,675 B2 | 3/2015 | Dawson et al. | |
| 9,283,954 B2 | 3/2016 | Dalum | |
| 9,545,854 B2 | 1/2017 | Daum et al. | |
| 9,669,821 B1 | 6/2017 | Laing | |
| 9,805,317 B2 | 10/2017 | Gudat et al. | |
| 10,696,164 B2 | 6/2020 | Zhao et al. | |
| 10,753,761 B2 | 8/2020 | Ricci | |
| 10,787,092 B2 | 9/2020 | Hou et al. | |
| 10,800,398 B2 | 10/2020 | Duan et al. | |

(Continued)

FOREIGN PATENT DOCUMENTS

| | | |
|---|---|---|
| CN | 103991384 B | 8/2014 |
| CN | 103818264 B | 3/2016 |

(Continued)

OTHER PUBLICATIONS

English Translation for KR20180021504A (Year: 2018).*

*Primary Examiner* — Rachid Bendidi
*Assistant Examiner* — Moises Gasca Alva

(57) ABSTRACT

A service vehicle can have a service vehicle battery that can provide energy to, and/or receive energy from, a separate machine that is normally configured to operate based on energy provided by a battery of the machine. If a machine becomes unable to operate using the battery of the machine, the service vehicle can travel to the machine and use an energy transfer arm to transfer energy to the machine. In some situations, the service vehicle and the machine can travel together in a convoy formation, for instance to a maintenance station, while the service vehicle provides the machine with energy for driving operations of the machine.

19 Claims, 4 Drawing Sheets

(56) References Cited

U.S. PATENT DOCUMENTS

| | | | |
|---|---|---|---|
| 10,802,490 B2* | 10/2020 | Harris | G05D 1/0212 |
| 10,836,371 B1 | 11/2020 | Thiruvengadam et al. | |
| 10,882,399 B2 | 1/2021 | Koebler et al. | |
| 10,946,764 B2 | 3/2021 | Morimoto et al. | |
| 2010/0094496 A1* | 4/2010 | Hershkovitz | B60L 50/66 |
| | | | 701/22 |
| 2014/0114514 A1 | 4/2014 | Crombez et al. | |
| 2016/0129793 A1* | 5/2016 | Cronie | H02J 50/90 |
| | | | 320/109 |
| 2017/0039668 A1* | 2/2017 | Luke | G06Q 10/06 |
| 2018/0060776 A1 | 3/2018 | Ahmed et al. | |
| 2018/0204161 A1* | 7/2018 | Sandulescu | G01R 31/382 |
| 2019/0009679 A1* | 1/2019 | Gaither | B60L 53/68 |
| 2019/0193582 A1* | 6/2019 | Matsuoka | H04W 84/00 |
| 2019/0344777 A1 | 11/2019 | Ourabah et al. | |
| 2019/0351773 A1* | 11/2019 | Merritt | B60L 53/51 |
| 2020/0122728 A1 | 4/2020 | Murase | |
| 2020/0317067 A1* | 10/2020 | Miller | H02J 7/0047 |
| 2021/0089050 A1* | 3/2021 | Georgeson | B60D 1/62 |
| 2021/0129695 A1* | 5/2021 | De Blasio | B60L 53/665 |
| 2021/0129697 A1* | 5/2021 | Cho | H02J 7/00034 |
| 2021/0316625 A1* | 10/2021 | Oetken | B60L 53/53 |
| 2022/0122213 A1* | 4/2022 | Ortiz | G06Q 10/20 |
| 2022/0258642 A1* | 8/2022 | Salter | B60L 53/14 |

FOREIGN PATENT DOCUMENTS

| | | |
|---|---|---|
| CN | 107117038 B | 9/2017 |
| CN | 10979537 A | 5/2019 |
| CN | 109878355 A | 6/2019 |
| CN | 111366211 A | 7/2020 |
| CN | 111907335 A | 11/2020 |
| JP | 2017154693 A | 9/2017 |
| KR | 20180021504 A * | 3/2018 |
| WO | WO2019210745 A1 | 11/2019 |
| WO | WO2020199873 A1 | 10/2020 |

\* cited by examiner

BATTERY SUPPORT SERVICE VEHICLE

TECHNICAL FIELD

The present disclosure relates to battery-powered electric machines and, more particularly, to a service vehicle that can provide energy to a disabled electric machine that is unable to operate based on energy provided by one or more batteries of the electric machine.

BACKGROUND

Electric machines, such as vehicles or other mobile machines, that are at least partially powered by on-board batteries can be environmentally-friendly alternatives to machines powered by fossil fuels. However, in some situations, machines may become disabled if their on-board batteries are unable to provide sufficient energy for operations of the machines.

For example, a machine may be unable to travel and/or perform other operations if a battery of the machine is not charged, is unable to hold a charge, or is unable to be charged. As another example, a machine may be unable to travel and/or perform other operations if a faulty electrical component or an electrical disconnection prevents components of the machine from receiving energy from a battery of the machine, even if the battery is charged.

Some systems have been developed that can provide energy to a machine while the machine is located away from a conventional machine charging station. For example, U.S. Pat. No. 10,787,092 to Hou et al. (hereinafter "Hou") describes a mobile charging apparatus that can automatically travel to an electric vehicle and charge a battery of the electric vehicle.

However, although the mobile charging system described by Hou can travel to an electric vehicle and provide energy to charge a battery of an electric vehicle, Hou indicates that the mobile charging system would connect to the electric vehicle and provide energy while the electric vehicle is parked in parking lot, or is otherwise stationary. Accordingly, the mobile charging system described by Hou may not allow the electric vehicle to travel while being charged by the mobile charging system. Additionally, the mobile charging system described by Hou may not be useful if a battery of a machine is unable to hold a charge or be charged, or if a separate electrical issue prevents the machine from operating based on energy stored in the battery. Moreover, even if the mobile charging system described by Hou is able charge a battery of a machine, but a separate electrical issue prevents the machine from operating based on energy stored in the charged battery, the machine may be stranded until a tow truck can transport the machine to a maintenance station or other location, potentially impacting site operations.

The example systems and methods described herein are directed toward overcoming one or more of the deficiencies described above.

SUMMARY OF THE INVENTION

According to a first aspect, a computer-implemented method includes receiving, by one or more processors, a notification indicating that a machine is unable to perform one or more driving operations using first energy provided by machine battery of the machine. The computer-implemented method also includes determining, by the one or more processors in response to the notification, a route for a service vehicle to travel with the machine, in a convoy formation, to a destination. The computer-implemented method further includes instructing, by the one or more processors, the service vehicle to travel to a location of the machine and attach an energy transfer arm of the service vehicle to an energy transfer port of the machine. The computer-implemented method additionally includes instructing, by the one or more processors, the service vehicle to transfer second energy from a service vehicle battery of the service vehicle to the machine via the energy transfer arm, and to travel with the machine, in the convoy formation, through the route while the energy transfer arm is attached to the energy transfer port of the machine.

According to a further aspect, a service controller associated with a worksite includes one or more processors and memory storing computer-executable instructions. The computer-executable instructions, when executed by the one or more processors, cause the one or more processors to perform operations. The operations include receiving a notification indicating that a machine on the worksite is unable to perform one or more driving operations using first energy provided by a machine battery of the machine. The operations also include identifying a service vehicle on the worksite that is available to assist the machine. The service vehicle includes a service vehicle battery and an energy transfer arm configured to attach to an energy transfer port of the machine. The operations further include generating a route for the service vehicle to travel with the machine, in a convoy formation, through the worksite to a destination. The operations additionally include dispatching the service vehicle to travel to a location of the machine, attach the energy transfer arm to the energy transfer port of the machine, transfer second energy from the service vehicle battery to the machine via the energy transfer arm, and travel with the machine, in the convoy formation, through the route while the energy transfer arm is attached to the energy transfer port of the machine.

According to another aspect, one or more non-transitory computer-readable media store computer-executable instructions. The computer-executable instructions, when executed by one or more processors, cause the one or more processors to perform operations. The operations include receiving a notification indicating that a machine on a worksite is unable to perform one or more driving operations using first energy provided by a machine battery of the machine. The operations also include identifying a service vehicle on the worksite that is available to assist the machine. The service vehicle includes a service vehicle battery and an energy transfer arm configured to attach to an energy transfer port of the machine. The operations further include generating a route for the service vehicle to travel with the machine, in a convoy formation, through the worksite to a destination. The operations additionally include dispatching the service vehicle to travel to a location of the machine, attach the energy transfer arm to the energy transfer port of the machine, transfer second energy from the service vehicle battery to the machine via the energy transfer arm, and travel with the machine, in the convoy formation, through the route while the energy transfer arm is attached to the energy transfer port of the machine.

BRIEF DESCRIPTION OF THE DRAWINGS

The detailed description is described with reference to the accompanying figures. In the figures, the left-most digit of a reference number identifies the figure in which the reference number first appears. The same reference numbers in different figures indicate similar or identical items.

DETAILED DESCRIPTION

Figure 1:
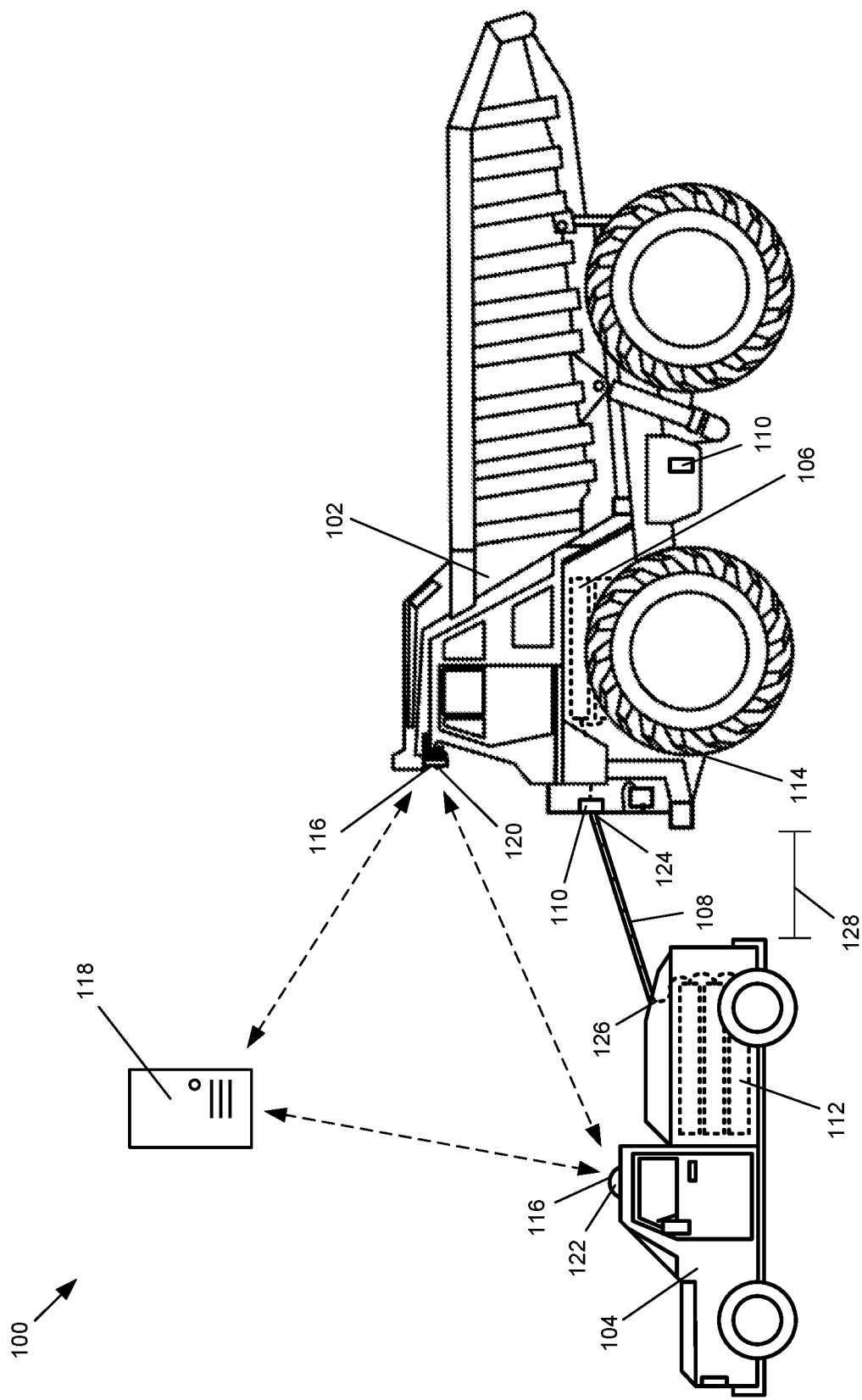
FIG. 1 shows an example of a system that includes a machine and a service vehicle that is configured to provide energy to the machine.

FIG. 1 shows an example of a system 100 that includes a machine 102 and a service vehicle 104 that is configured to provide energy to the machine 102. The machine 102 is configured to be at least partially powered by a machine battery 106. However, the machine 102 can be disabled, or be rendered at least partially inoperable, due to one or more issues that prevent the machine 102 from operating based on energy provided by the machine battery 106. In situations in which the machine 102 is unable to operate based on energy provided by the machine battery 106, the service vehicle 104 can drive to the machine 102 and provide energy to the machine 102. In other situations, a problem with the machine battery 106 or electrical connections in the machine 102 may prevent the machine 102 from storing energy captured by a regenerative brake system in the machine battery 106. In these situations, the service vehicle 104 can drive to the machine 102 and receive the energy captured by the regenerative brake system of the machine 102. The service vehicle 104 and the machine 102 can travel together, in a convoy formation, while energy is transferred to and/or from the machine 102.

For example, an energy transfer arm 108 of the service vehicle 104 can be configured to attach to an energy transfer port 110 of the machine 102. A service vehicle battery 112 of the service vehicle 104 can be linked to the energy transfer arm 108, such that the service vehicle battery 112 can provide energy to the machine 102 via the energy transfer arm 108 when the energy transfer arm 108 is connected to the energy transfer port 110 of the machine 102. Accordingly, although the machine 102 may be unable to move and/or operate based on energy from the machine battery 106, the machine 102 can move and/or operate based on energy received from the service vehicle battery 112 while the energy transfer arm 108 of the service vehicle 104 is connected to the energy transfer port 110 of the machine 102. For example, the service vehicle 104 and the machine 102 can travel together in a convoy formation while the service vehicle battery 112 is providing energy to the machine 102 via the energy transfer arm 108.

The machine 102 can be a mobile machine or vehicle that is configured to, normally, be at least partially powered by the machine battery 106. For example, the machine 102 can be a battery electric machine (BEM), a battery electric vehicle (BEV), a hybrid vehicle, a fuel cell and battery hybrid vehicle, or another mobile machine that is at least partially powered by the machine battery 106. The machine 102 can have one or more electric engines, electric motors, electrical conversion systems, electric drivetrains, and/or other electrical components that are configured to convert and/or use energy, such as energy stored in the machine battery 106 to cause overall movement of the machine 102 while driving, and/or to cause movement of individual work tools and other components of the machine 102. As an example, the machine 102 can have a traction motor that is configured to consume energy stored in the machine battery 106 to turn wheels of the machine 102. As described herein, the electrical components of the machine 102 can also, or alternately, operate based on energy provided by the service vehicle battery 112, for instance if the machine battery 106 is unable to store energy or provide energy to the electrical components of the machine 102.

The machine battery 106 can include one or more batteries, such as lithium-ion (Li-ion) batteries, lithium-ion polymer batteries, nickel-metal hydride (NiMH) batteries, lead-acid batteries, nickel cadmium (Ni—Cd) batteries, zinc-air batteries, sodium-nickel chloride batteries, or other types of batteries. In some examples, multiple battery cells can be grouped together, in series or in parallel, within a battery module. Multiple battery modules can also be grouped together, for instance in series, within a battery string. One or more battery strings can be provided within a battery pack, such as a group of battery strings linked together in parallel. Accordingly, the machine battery 106 can include one or more battery packs, battery strings, battery modules, and/or battery cells.

As described herein, one or more issues may prevent the machine 102 from operating normally based on energy provided by the machine battery 106. However, electrical components of the machine 102 can operate based on energy provided by the service vehicle battery 112 via the energy transfer arm 108, instead of or in addition to energy provided by the machine battery 106. In some examples, the machine battery 106 may be able to provide some energy, for instance at a reduced level, for some operations of the machine 102. As an example, if one or more battery strings, packs, or modules of the machine battery 106 are faulty, some other battery strings, packs, or modules of the machine battery 106 may remain functional and be able to provide at least some level of energy for operations of the machine 102. In other examples, the machine 102 can have switches, circuit breakers, or other connects or disconnects that can selectively disconnect the machine battery 106 from one or more electrical components of the machine 102 and/or connect the electrical components of the machine 102 to the energy transfer arm 108, such that the electrical components of the machine 102 can operate directly based on energy received from the service vehicle 104.

The machine 102 can, in some examples, be a commercial or work machine, such as a mining machine, earth-moving machine, backhoe, scraper, dozer, loader (e.g., large wheel loader, track-type loader, etc.), shovel, truck (e.g., mining truck, haul truck, on-highway truck, off-highway truck, articulated truck, etc.), a crane, a pipe layer, farming equipment, or any other type of mobile machine or vehicle. As described further below with respect to FIG. 2, the machine 102 may operate at, and/or travel around, a mine site, a quarry, a construction site, or any other type of worksite or work environment. As an example, the machine 102 can be a haul truck that moves dirt, rocks, gravel, and/or other material around a worksite. In other examples, the machine 102 can be an electric automobile or other type of electric vehicle or mobile machine used for personal transportation, commercial transportation, or other purposes, such as an electric vehicle configured to travel on public and/or private roads.

The machine 102 can have one or more brake systems 114, such as a service brake system, a regenerative brake system, and/or a resistive brake system. The service brake system can be a hydraulic braking system or other mechanical braking system configured to apply brake pads against rotors to frictionally slow down wheels of the machine 102. The regenerative brake system can be configured to capture kinetic energy and/or potential energy during braking and/or deceleration of the machine 102, and to store the captured energy in the machine battery 106. The resistive brake system can be a dynamic braking system that is configured to similarly capture kinetic energy and/or potential energy during braking and/or deceleration of the machine 102, and to dissipate the energy as heat in one or more resisters in the machine 102. For example, the resistive brake system can include a resistive grid with a coil that can conduct electricity while blowers blow air across the coil. Such a resistive coil can consume energy by converting the energy to heat. In some examples, the machine 102 can have a regenerative brake system and a service brake system, but may lack a resistive brake system.

Braking capacities associated with one or more of the brake systems 114 can vary based on current usage levels, attributes of the machine battery 106, and/or other factors. For example, a braking capacity of the regenerative brake system can vary based on a current state of charge (SoC) of the machine battery 106 and/or a maximum SoC of the machine battery 106, a currently available capacity of the machine battery 106 indicating how much additional energy the machine battery 106 could store, and/or a current maximum charge rate at which energy could be transferred to the machine battery 106 by the regenerative brake system. As another example, a braking capacity of the resistive brake system can be based on a current amount of energy being consumed by a resistive grid of the resistive brake system and/or a currently available capacity for additional energy that could be consumed by the resistive grid of the resistive brake system.

Accordingly, one or more of the brake systems 114 may become at least partially inoperable or lose at least some braking capacity in sonic situations, for instance due to an issue with the brake systems 114 and/or an issue that prevents the machine battery 106 from storing energy and/or providing energy to other components of the machine 102. As an example, an issue with the regenerative brake system, the machine battery 106, or another component of the machine 102 may prevent the regenerative brake system from capturing energy and/or storing captured energy in the machine battery 106, such that the regenerative brake system loses at least some braking capacity. In some examples, if one or more of the brake systems 114 becomes inoperable or loses braking capacity, one or more other brake systems 114 may remain functional. For instance, if the regenerative brake system becomes inoperable, the machine 102 may still be able to use the service brake system and/or the resistive brake system to slow and/or stop the machine 102.

As noted above, if the machine battery 106 includes multiple packs or strings, some of the packs or strings may be faulty, while other packs or stings may be functional. Accordingly, if some packs or strings remain functional, those packs or strings may be able to provide or receive energy and thereby allow a brake system of the machine 102 to have at least some remaining braking capacity.

The machine 102 can have one or more wireless communication interfaces 116, such as cellular interfaces, WiFi® interfaces, Bluetooth® interfaces, machine-to-machine data interfaces, and/or other types of wireless communication interfaces. The wireless communication interfaces 116 can include modems, receivers, transmitters, antennas, and/or other hardware or software elements configured to send and receive data. The service vehicle 104 can have the same, or similar, wireless communication interfaces 116. Accordingly, the machine 102 and the service vehicle 104 can use wireless communication interfaces 116 to communicate with each other directly, or to communicate with each other indirectly through one or more intermediate computing elements. As discussed further below, in some examples, the energy transfer arm 108 can also include Ethernet cables or other types of data transfer cables, such that the service vehicle 104 and the machine 102 can exchange data when the energy transfer arm 108 is connected to the machine 102.

In some examples, the machine 102 and/or the service vehicle 104 can use wireless communication interfaces 116 to communicate with a service controller 118, The service controller 118 can be one or more servers, computers, or other off-board computing devices that are separate from the machine 102 and the service vehicle 104. For example, while the machine 102 and the service vehicle 104 can be located at a worksite, the service controller 118 can be located at a back office or other location that is remote from the machine 102 and the service vehicle 104, or that is remote from the worksite overall. In some examples, one or more functions of the service controller 118 can be implemented by an application executing on a laptop computer, smartphone, tablet computer, or other mobile device, such as a mobile device used by an operator of the machine 102 or another user located away from the machine 102. The service controller 118 can be configured to monitor operations of the machine 102 and/or the service vehicle 104, for instance based on data reported by the machine 102 and/or the service vehicle 104 via the wireless communication interfaces 116.

The service controller 118 can also be configured to direct operations of the machine 102 and/or the service vehicle 104, for instance through instructions sent by the service controller 118 to the wireless communication interfaces 116 of the machine 102 and/or the service vehicle 104. For example, as discussed further below with respect to FIG. 2, the service controller 118 can be configured to generate and/or select routes through a worksite for the machine 102 and/or the service vehicle 104, dispatch the service vehicle 104 to provide energy to the machine 102 when the machine 102 becomes at least partially disabled, and/or otherwise direct the machine 102 and/or the service vehicle 104 to perform actions based on data provided by the service controller 118, The machine 102 can be a staffed machine, a semi-autonomous machine, or an autonomous machine. In examples in which the machine 102 is a staffed machine or a semi-autonomous machine, a human operator or driver can operate, control, or direct sonic or all of the functions of the machine 102. However, in examples in which the machine 102 is autonomous or semi-autonomous, functions of the machine 102, such as steering, speed adjustments, work tool positioning and movement, and/or other functions can be fully or partially controlled, automatically or semi-automatically, by on-board and/or off-board controllers or other computing devices associated with the machine 102.

As an example, the machine 102 can have an electronic control module (ECM) or other on-board computing device that can fully or partially control operations of the machine 102. For instance, the machine 102 can have an on-board guidance system that can drive the machine 102 through a route autonomously, an obstacle detection system that assists the on-board guidance system or can alert a human operator of nearby objects detected by the obstacle detection system, and/or other systems that fully or partially control operations of the machine 102. As another example, the service controller 118 or another off-board computing device can receive data from the machine 102 and return instructions to the machine 102 to fully or partially control operations of the machine 102 remotely.

The machine 102 can have one or more machine sensors 120, such as cameras, LIDAR sensors, RADAR sensors, other optical sensors or perception systems, Global Positioning System (GPS) sensors, other location and/or positioning sensors, payload monitors, speed sensors, temperature sensors, tire pressure sensors, battery state of health (SoH) sensors, and/or other types of sensors. The battery SoH sensors can be configured to determine a current SoC of the machine battery 106. In some examples, one or more battery SoH sensors can also detect a state of health of the machine battery 106, such as abilities of the machine battery 106 to maintain a charge, receive a charge, and/or transfer energy at a power level. The battery SoH sensors can also, in some examples, detect temperatures associated with the machine battery 106, an operating state of a cooling system configured to cool the machine battery 106, and/or other attributes or characteristics of the machine battery 106.

In some examples, one or more of the machine sensors 120 can provide data to an ECM of the machine 102 and/or the service controller 118, such that the ECM and/or the service controller 118 can determine a location of the machine 102, detect nearby terrain, detect nearby objects, detect the positions of such nearby objects relative to the machine 102, determine a weight and/or amount of a payload carried by the machine 102, and/or perform other operations that enable the machine 102 to drive and/or operate autonomously or semi-autonomously. Data associated with one or more of the machine sensors 120 can also be provided to a driver or other operator of the machine 102 via dashboard indicator lights, screens, or other displays, for instance if the machine 102 is a staffed machine. In some examples, data associated with one or more of the machine sensors 120 can also be transmitted to the service vehicle 104.

As discussed above, the machine 102 can be configured to, normally, operate based on energy provided by the machine battery 106. However, in some situations, a failure or other issue associated with the machine battery 106 may fully or partially disable the machine 102. For example, the machine 102 can become stranded on a worksite if the machine battery 106 becomes discharged such that machine battery 106 is unable to output sufficient energy to allow the machine 102 to drive to a charging station that configured to recharge the machine battery 106. As another example, the machine battery 106 may become unable to hold a charge and/or to be recharged, such that the machine battery 106 is unable to provide energy for operations of the machine 102. As yet another example, faults or disconnections associated with wiring or other electrical connections may prevent the machine battery 106 from delivering energy to other components of the machine 102, such that the machine 102 can become disabled and be unable to consume energy stored in the machine battery 106 even if the machine battery 106 is itself charged and is not experiencing any faults. As still another example, the machine 102 can have a pantograph connector configured to receive energy from electrified trolley lines to recharge the machine battery 106, but the machine 102 can become disabled if the pantograph connector is damaged or is unable to connect to the trolley lines such that the machine battery 106 drains.

The machine 102 can be configured to notify the service controller 118 and/or the service vehicle 104 when the machine 102 becomes fully or partially disabled due to an issue that prevents the machine 102 from operating based on energy stored in the machine battery 106. In some examples, the wireless communication interfaces 116 can be at least temporarily powered by backup batteries, other auxiliary power sources, or a relatively small amount of energy remaining in the machine battery 106, even if some or all other functions of the machine 102 are disabled due to issues that prevent the machine battery 106 from operating normally based on energy provided by the machine battery 106. Accordingly, the machine 102 can use the wireless communication interfaces 116 to transmit a notification to the service controller 118 and/or the service vehicle 104 that indicates that the machine 102 has become fully and/or partially disabled, and/or that requests assistance from the service vehicle 104. The notification may indicate a location of the machine 102, battery SOH information, such as a current state of charge of the machine battery 106 and/or other battery information, and/or other information. The notification may also include a fault code or other indication that the machine 102 may be operable based on power received from the service vehicle 104, and is not disabled due to an issue that would entirely prevent operations of the machine 102. The machine 102 can be configured to submit such a notification to the service controller 118 and/or the service vehicle 104 automatically upon becoming fully or partially disabled, based on a manual user instruction, or based on any other condition.

In other examples, an operator of the machine 102, or any other user, can use a mobile device or other computing device to transmit a notification to the service controller 118 and/or the service vehicle 104 indicating that the machine 102 has become fully or partially disabled. In still other examples, a user of the service controller 118 can provide other user input to the service controller 118 indicating that the machine 102 has become fully or partially disabled.

In situations in which components of the machine 102 are unable to receive energy from the machine battery 106 or consume energy stored in the machine battery 106, such that the machine 102 becomes partially or fully disabled, the service vehicle 104 can be dispatched to assist the machine 102. For example, the service vehicle 104 can respond to a notification received directly from the machine 102 that requests assistance from the service vehicle 104, or the service vehicle 104 can be dispatched by the service controller 118 in response to a similar notification sent by the machine 102 or another source to the service controller 118. The dispatched service vehicle 104 can drive to the disabled machine 102, attach the energy transfer arm 108 to the energy transfer port 110 of the machine 102, and transfer energy from the service vehicle battery 112 to the machine 102 via the energy transfer arm 108. Accordingly, although components of the machine 102 may be unable to access energy from the machine battery 106, the components of the machine 102 may be able to operate based on energy received from the service vehicle battery 112 via the energy transfer arm 108.

The energy transfer port 110 of the machine 102 can be a wired or wireless energy transfer interface. For example, the energy transfer port 110 of the machine 102 can be an electrical plug, outlet, connector, charging port, or other wired electrical energy transfer interface that can be physically connected to the energy transfer arm 108 of the service vehicle 104. As another example, the energy transfer port 110 can be an inductive charging pad or other type of wireless energy transfer interface that can transfer energy wirelessly to and/or from the energy transfer arm 108 of the service vehicle 104. The energy transfer port 110 can be located at the front of the machine 102, at the back of the machine 102, on a side of the machine 102, or at any other position on the machine 102.

In some examples, the energy transfer port 110 can be a primary energy transfer port of the machine 102. For example, the energy transfer port 110 can be a primary energy transfer port that is configured to normally be connected to a charging cable or other connector at a conventional charging station, such that the machine 102 can receive electrical energy through the energy transfer port 110 from the charging station and use the received energy to charge the machine battery 106 and/or to power other elements of the machine 102. Accordingly, in examples described herein, the machine 102 can receive energy through a primary energy transfer port from the service vehicle 104, instead of from a conventional charging station.

In other examples, the energy transfer port 110 can be a secondary or auxiliary energy transfer port of the machine 102 that is not configured to provide energy to the machine battery 106, but that is configured to provide energy to other electrical components of the machine 102 so that the machine 102 can operate. Accordingly, if the machine battery 106 is faulty, the machine 102 can operate based on auxiliary energy received via a secondary energy transfer port from the service vehicle 104.

The machine 102 can accordingly have multiple energy transfer ports, such as a primary energy transfer port on the front of the machine 102 and a secondary transfer port on a side of the machine 102, or that are located at any other positions or are arranged in any other arrangements. In some examples, a notification provided by the machine 102, and/or dispatch instructions from the service controller 118, can indicate which energy transfer port 110 to use, a type of the energy transfer port 110, a position of the energy transfer port 110 on the machine 102, a position relative to the machine 102 where the service vehicle 104 can park while connecting the energy transfer arm 108 to the energy transfer port 110, and/or other information associated with the energy transfer port 110, In some examples, the primary energy transfer port of the machine 102 can be a pantograph or other connector configured to connect to electrified trolley lines. In these examples, the machine 102 can have a secondary energy transfer port, to which the energy transfer arm 108 of the service vehicle 104 can connect.

In some examples, energy transferred from the service vehicle 104 to the machine 102 via the energy transfer arm 108 can be used to recharge the machine battery 106. In other examples, for instance if the machine battery 106 is unable to hold a charge or is unable to be recharged, or if an issue is preventing energy from the machine battery 106 from being delivered to electrical elements of the machine 102, the machine 102 can use the energy transferred from the service vehicle battery 112 to operate one or more electric engines, electric motors, electric drivetrains, and/or other electrical elements of the machine 102. The machine 102 can pass the energy received from the service vehicle battery 112 through the machine battery 106 to other electrical elements of the machine 102, or can bypass the service vehicle battery 112 and deliver the energy received from the service vehicle battery 112 directly to other electrical elements of the machine 102. Accordingly, the machine 102 can operate using energy received from the service vehicle battery 112 while the machine 102 is connected to the service vehicle 104.

Although the service vehicle 104 can transfer energy to the machine 104 as described above, in some examples the machine 102 can also, or alternately, transfer energy to the service vehicle 104. The service vehicle battery 112 can, for example, store energy received from the machine 102 and/or the machine battery 106 via the energy transfer arm 108 while the machine 102 is connected to the service vehicle 104. For instance, if a regenerative brake system of the machine 102 is able to capture energy during braking and/or deceleration of the machine 102, but the machine battery 106 is unable to receive or store the captured energy, the energy generated by the regenerative brake system of the machine 102 can be transferred from the machine 102 to the service vehicle 104 via the energy transfer arm 108 and be used to charge the service vehicle battery 112.

The service vehicle 104 can be a vehicle or other mobile machine, Similar to the machine 102, the service vehicle 104 be a staffed machine, a semi-autonomous machine, or an autonomous machine. For example, the service vehicle 104 can be a truck, vehicle, or other mobile machine that can be driven and controlled by a human driver. In other examples, the service vehicle 104 can be an autonomous machine or semi-autonomous machine, such that functions of the service vehicle 104, such as steering, speed adjustments, positioning and movement of the energy transfer arm 108, and/or other functions can be fully or partially controlled, automatically or semi-automatically, by on-board and/or off-board controllers or other computing devices associated with the service vehicle 104. As an example, the service vehicle 104 can have an ECM or other on-board computing device that can fully or partially control operations of the service vehicle 104. For instance, the service vehicle 104 can have an on-board guidance system that can drive the service vehicle 104 through a route autonomously, an obstacle detection system that assists the on-board guidance system or can alert a human operator of nearby objects detected by the obstacle detection system, and/or other systems that fully or partially control operations of the service vehicle 104. As another example, the service controller 118 or another off-board computing device can receive data from the service vehicle 104 and return instructions to the service vehicle 104 to fully or partially control operations of the machine 102 remotely.

For instance, as described further below, the service controller 118 can receive a notification from the machine 102 indicating that the machine 102 is disabled and stranded at a location on a worksite. The service controller 118 can respond by dispatching the service vehicle 104 to travel to the machine 102 and to provide the machine 102 with energy while the machine 102 and the service vehicle 104 travel together in a convoy formation to a maintenance station or other destination. The machine 102 and the service vehicle 104 can collectively be referred to as machines during travel in the convoy formation. In some examples, the service controller 118 can also generate and/or select routes for the service vehicle 104 and/or the machine 102, as described further below with respect to FIG. 2 and FIG. 3.

The service vehicle 104 can have service vehicle sensors 122 similar to the machine sensors 120. For example, the service vehicle sensors 122 can include cameras, LIDAR sensors, RADAR sensors, other optical sensors or perception systems, GPS sensors, other location and/or positioning sensors, speed sensors, temperature sensors, tire pressure sensors, battery SoH sensors, and/or other types of sensors. The battery SoH sensors of the service vehicle 104 can be configured to determine a current SoC of the service vehicle battery 112. In some examples, one or more battery SoH sensors can also detect a state of health of the service vehicle battery 112, such as abilities of the service vehicle battery 112 to maintain a charge, receive a charge, and/or transfer energy at a power level. The battery SoH sensors can also, in some examples, detect temperatures associated with the service vehicle battery 112, an operating state of a cooling system configured to cool the service vehicle battery 112, and/or other attributes or characteristics of the service vehicle battery 112.

In some examples, one or more of the service vehicle sensors 122 can provide data to an ECM of the service vehicle 104 and/or the service controller 118, such that the ECM and/or the service controller 118 can determine a location of the service vehicle 104, detect nearby terrain, detect nearby objects, detect the positions of such nearby objects relative to the service vehicle 104, and/or perform other operations that enable the service vehicle 104 to drive and/or operate autonomously or semi-autonomously. Data associated with one or more of the service vehicle sensors 122 can also be provided to a driver or other operator of the service vehicle 104 via dashboard indicator lights, screens, or other displays, for instance if the service vehicle 104 is a staffed vehicle. In some examples, data associated with one or more of the service vehicle sensors 122 can also be transmitted to the machine 102.

As discussed above, the service vehicle 104 can include the service vehicle battery 112. Similar to the machine battery 106, the service vehicle battery 112 can include one or more batteries, such as Li-ion batteries, lithium-ion polymer batteries. NiMH batteries, lead-acid batteries, Ni—Cd batteries, zinc-air batteries, sodium-nickel chloride batteries, or other types of batteries. The service vehicle battery 112 can also include one or more battery packs, battery strings, battery modules, and/or battery cells.

In some examples, the service vehicle 104 can be at least partially powered by the service vehicle battery 112. For instance, the service vehicle 104 can be a BEM, a BEV, a hybrid vehicle, a fuel cell and battery hybrid vehicle, or another type of vehicle or mobile machine that operates at least in part using energy provided by the service vehicle battery 112. In these examples, the service vehicle 104 can have one or more electric engines, electric motors, electrical conversion systems, electric drivetrains, and/or other electrical components that are configured to convert and/or use energy, such as energy stored in the service vehicle battery 112, to cause overall movement of the service vehicle 104 while driving and/or to cause movement of the energy transfer arm 108 and other components of the service vehicle 104. As an example, the service vehicle 104 can have a traction motor that is configured to consume energy stored in the service vehicle battery 112 to turn wheels of the service vehicle 104. In other examples, the service vehicle 104 can be a gas-powered vehicle or any other type of vehicle or mobile machine, but can include the service vehicle battery 112 so that the service vehicle 104 can provide energy to disabled machines such as the machine 102.

In some examples, the service vehicle 104 can have different service vehicle batteries for different purposes. For instance, the service vehicle 104 can have a first service vehicle battery that is configured to provide energy for operations of the service vehicle 104 itself, and have a second service vehicle battery that is reserved for providing energy to disabled machines via the energy transfer arm 108. In other examples, the service vehicle 104 can use the same service vehicle battery 112 to power operations of the service vehicle 104 and also to provide energy to disabled machines via the energy transfer arm 108. For instance, the service vehicle battery 112 can have a capacity sufficient to store enough energy to power typical operations of the service vehicle 104, and also to power operations of one or more machines via the energy transfer arm 108, over a three-hour period, a twelve-hour period, a twenty-four-hour period, or any other period of time.

The energy transfer arm 108 can be a pole, a rod, a mechanical and/or robotic arm, or another elongated body or apparatus that can extend between the service vehicle 104 and the machine 102, as described herein. A first end of the energy transfer arm 108 can be connected to one or more portions of the service vehicle 104. A second end of the energy transfer arm 108 can have at least one energy transfer connector 124 configured to selectively attach to the energy transfer port 110 of the machine 102. At least one cable 126 can extend from the service vehicle battery 112 to the first end of the energy transfer arm 108, and from the first end of the energy transfer arm 108 to the energy transfer connector 124 at the second end of the energy transfer arm 108. Accordingly, when the energy transfer connector 124 of the energy transfer arm 108 is connected to the energy transfer port 110 of the machine 102, electrical current can flow through the cable 126 to transfer energy from the service vehicle battery 112 to the machine 102. Similarly, in some examples, the machine 102 can provide energy to the service vehicle battery 112 via the cable 126 when the energy transfer connector 124 of the energy transfer arm 108 is connected to the energy transfer port 110 of the machine 102. In some examples, one or more other cables that extend through or along the energy transfer arm 108 can be Ethernet cables or other types of data transfer cables, such that the service vehicle 104 and the machine 102 can exchange data when the energy transfer arm 108 is connected to the machine 102.

The energy transfer connector 124 of the energy transfer arm 108 can be a wired or wireless energy transfer interface that is compatible with the energy transfer port 110 of the machine 102. For example, the energy transfer connector 124 of the energy transfer arm 108 can be an electrical plug, outlet, connector, charging port, or other wired electrical energy transfer interface that can be physically connected to the energy transfer port 110 of the machine 102. As another example, the energy transfer connector 124 of the energy transfer arm 108 can be an inductive charging pad or other type of wireless energy transfer interface that can transfer energy wirelessly to and/or from the energy transfer port 110 of the machine 102.

In some examples, the energy transfer arm 108 can have multiple types of energy transfer connectors that are compatible with different types of energy transfer ports. In these examples, when the service vehicle 104 is dispatched to provide energy to a particular machine, a notification from the machine or information from the service controller 118 can indicate a type of the energy transfer port of the particular machine. Accordingly, the service vehicle 104 can select one of the multiple energy transfer connectors that is compatible with the type of the energy transfer port of the particular machine. As an example, the second end of the energy transfer arm 108 can have a rotatable disk with different types of energy transfer connectors, such that the energy transfer arm 108 can rotate the disk to select a particular energy transfer connector that is compatible with a particular type of energy transfer port. The rotation of the disk can move the selected energy transfer connector into a position that connects the selected energy transfer connector to the cable 126. In other examples, the second end of the energy transfer arm 108 can have multiple energy transfer connectors that can fold in or out, slide in or out, or otherwise move to engage a selected energy transfer connector, have elements that move the cable 126 between different energy transfer connectors to engage a selected energy transfer connector, and/or have elements that divert an electrical path from the cable 126 to different energy transfer connectors to engage a selected energy transfer connector.

The cable 126 can extend through the interior of the energy transfer arm 108, along the exterior of the energy transfer arm 108, or otherwise pass from the service vehicle battery 112 to the energy transfer connector 124 at the second end of the energy transfer arm 108. As an example, the cable 126 can pass through one or more loops on the exterior of the energy transfer arm 108, but may hang away from the energy transfer arm 108 between the loops based on an amount of slack associated with the cable 126.

The service vehicle 104 can have one or more cooling elements configured to cool the service vehicle battery 112 and/or the cable 126. For example, when energy is being transferred via the cable 126 to or from the service vehicle battery 112, service vehicle sensors 122 can monitor the temperature of the service vehicle battery 112 and/or the cable 126. Cooling elements, such as cooling elements on or within the energy transfer arm 108 and/or proximate to the service vehicle battery 112, can be configured to cool the service vehicle battery 112 and/or the cable 126 to maintain temperatures at or below threshold temperatures.

The energy transfer arm 108 can have an at least partially rigid frame, such that a length and position of the energy transfer arm 108 relative to the machine 102 and/or other portions of the service vehicle 104 can be maintained during use of the energy transfer arm 108. However, in some examples, the energy transfer arm 108 can be extendable and/or retractable, such that a length of the energy transfer arm 108 can be adjusted, and/or the energy transfer arm 108 can move between a collapsed or stowed position and an extended position in which the length and position of the energy transfer arm 108 relative to the machine 102 and/or other portions of the service vehicle 104 can be maintained.

As an example, the energy transfer arm 108 can be a telescoping pole that has multiple telescoping segments, such that the energy transfer arm 108 can extend from a stowed position to one or more lengths based on movement of the telescoping segments. As another example, the energy transfer arm 108 can have multiple hinged segments, such that the hinged segments can be rotated, or folded and unfolded, relative to one another to adjust the shape and/or length of the energy transfer arm 108.

The cable 126 can be at least partially wrapped around a reel in the service vehicle 104, such that service vehicle 104 can use the reel to extend or retract the cable 126 based on movement of the energy transfer arm 108. For example, as the energy transfer arm 108 extends from a stowed position to an extended position, the service vehicle 104 can unspool a corresponding length of the cable 126 from the reel.

The reel can have slack sensors and/or a slack control system, such that the service vehicle 104 can control the reel to adjust tension and/or slack associated with the cable 126. For example, the service vehicle 104 can use the reel to provide some slack in the cable 126 so that, if a distance between the machine 102 and the service vehicle 104 changes while the energy transfer arm 108 is connected to the machine 102, available slack in the cable 126 can prevent a break in the electrical connection between the service vehicle battery 112 and the machine 102. The service vehicle 104 can also use the reel to control the slack of the cable 126, so that any portions of the cable 126 that hang from the energy transfer arm 108 can be prevented from reaching the ground or coming into contact with other objects.

In some examples, the energy transfer connector 124 of the energy transfer arm 108 can be selectively detached from other portions of the energy transfer arm 108, such as rigid portions of the frame of the energy transfer arm 108, but can remain connected to the cable 126. The cable 126 can be flexible, such that the cable 126 can hang and/or extend between the energy transfer connector 124 and other portions of the energy transfer arm 108. For example, the service vehicle 104 can use the energy transfer arm 108 to connect the energy transfer connector 124 to the energy transfer port 110 of the machine 102, and then disconnect the energy transfer connector 124 from rigid sections of the energy transfer arm 108 such that a length of the cable 126 hangs between the energy transfer connector 124 and the rigid sections of the energy transfer arm 108. Accordingly, if a distance between the machine 102 and the service vehicle 104 changes while the energy transfer connector 124 is connected to the machine 102, the hanging portion of the cable 126 can flex to account for the change in distance and prevent a break in the electrical connection between the service vehicle battery 112 and the machine 102.

Moveable and/or flexible elements at one or both ends of the energy transfer arm 108 can allow the service vehicle 104 to connect the energy transfer arm 108 to the machine 102. The moveable and/or flexible elements at one or both ends of the energy transfer arm 108 can also allow the connection between the service vehicle 104 and the machine 102 to be maintained through the energy transfer arm 108 while the service vehicle 104 and the machine 102 travel together in a convoy formation.

For example, the first end of the energy transfer arm 108 can be connected to a body of the service vehicle 104 via a hinge, ball joint, or other connection, such that the energy transfer arm 108 can rotate and/or move to different angles and positions relative to the service vehicle 104. In some examples, the second end of the energy transfer arm 108 and/or the energy transfer connector 124 can similarly be connected to an intermediate portion of the energy transfer arm 108 via a hinge, ball joint, or other connection, such that the second end of the energy transfer arm 108 and/or the energy transfer connector 124 can rotate and/or move to different angles and positions relative to the intermediate portion of the energy transfer arm 108. In other examples, the energy transfer connector 124 can be selectively disconnected from the second end of the energy transfer arm 108 or an intermediate portion of the energy transfer arm 108 when the energy transfer connector 124 is attached to the energy transfer port 110 of the machine 102, as discussed above. Accordingly, a flexible portion of the cable 126, between the energy transfer connector 124 and other portions of the energy transfer arm 108, can allow movement and/or distance changes between the energy transfer connector 124 and other portions of the energy transfer arm 108.

The energy transfer arm 108, and/or other portions of the service vehicle 104, can have motors, actuators, hydraulic elements, or other mechanisms configured to automatically extend and retract the energy transfer arm 108, control the movement of the energy transfer arm 108, and/or adjust the length, shape, angle, and/or position of the energy transfer arm 108. For example, such motors, actuators, hydraulic elements, or other mechanisms can be configured to extend or retract the energy transfer arm 108, move the energy transfer arm 108 to connect to the energy transfer port 110 of the machine 102, and/or move the energy transfer arm 108 during convoy travel of the service vehicle 104 and the machine 102.

In some examples, one or more of the service vehicle sensors 122 can be mounted on the energy transfer arm 108, and/or be configured to monitor and/or direct the movement of the energy transfer arm 108 during connection and/or disconnection of the energy transfer arm 108 with the machine 102. For example, one or more cameras, perception systems, positional sensors, or other service vehicle sensors 122 on the energy transfer arm 108 or other portions of the service vehicle 104 can be configured to detect a location of the machine 102. The service vehicle sensors 122 can also detect a position of the energy transfer port 110 of the machine 102, and/or a relative position of the second end of the energy transfer arm 108 and/or the energy transfer connector 124 with the energy transfer port 110 of the machine 102. Accordingly, an ECM of the service vehicle 104, the service controller 118, or another computing element associated with the service vehicle 104 can use data provided by the service vehicle sensors 122 to automatically instruct the energy transfer arm 108 to extend, pivot, and/or otherwise move, and to guide the energy transfer arm 108 to attach the energy transfer connector 124 to the energy transfer port 110 of the machine 102. For example, the ECM of the service vehicle 104 can control actuators associated with movement of the energy transfer arm 108, based on data provided by service vehicle sensors 122, to automatically connect the energy transfer arm 108 to the energy transfer port 110 of the machine 102.

In some examples, when the energy transfer connector 124 is connected to the energy transfer port 110 of the machine 102, the service vehicle 104 can detect that an electrical connection has been made successfully, and can provide a corresponding notification to an operator of the service vehicle 104, to the machine 102, and/or to the service controller 118. In some examples, the service vehicle 104 can also detect attributes of the machine 102 once the energy transfer arm 108 is connected to the machine 102, such as current braking capacities of the machine 102, abilities of the machine battery 106 to receive and/or store energy, and/or other information. Similarly, if an established electrical connection between the service vehicle 104 and the machine 102 is broken, the service vehicle 104 can detect the broken electrical connection and provide a corresponding notification or alert to an operator of the service vehicle 104, to the machine 102, and/or to the service controller 118.

Overall, when the machine 102 becomes fully or partially disabled due to an issue that prevents the machine 102 from operating based on energy provided by the machine battery 106, the service vehicle 104 can be dispatched to travel to the location of the disabled machine 102. The service vehicle 104 can attach the energy transfer connector 124 of the energy transfer arm 108 to the energy transfer port 110 of the machine 102, and can provide energy from the service vehicle battery 112 to the machine 102 via the energy transfer arm 108. The machine 102 can use the energy received from the service vehicle battery 112 to charge the machine battery 106 anchor to power operations of the machine 102. For instance, if the machine battery 106 is unable to be charged or to hold a charge, the machine 102 can operate based on energy received from the service vehicle battery 112 via the energy transfer arm 108.

In some examples, the machine 102 can travel, via an electric drivetrain and/or other components of the machine 102, using energy received from the service vehicle battery 112 while the machine 102 and the service vehicle 104 are connected via the energy transfer arm 108. The machine 102 and the service vehicle 104 can accordingly travel together in a convoy formation while the machine 102 and the service vehicle 104 are connected by the energy transfer arm 108 and the service vehicle 104 provides energy to the machine 102. For example, as described further below with respect to FIG. 2, the service vehicle 104 can provide energy to the machine 102 while the machine 102 and the service vehicle 104 travel together to a maintenance station. The maintenance station can be a facility that may be able to repair the machine 102, replace the machine battery 106, or otherwise resolve the issues that prevented the machine 102 from operating based on energy from the machine battery 106.

In some examples, the service vehicle 104 can be a leading machine that travels ahead of the machine 102 during travel in a convoy formation. For instance, if the machine 102 is a haul truck or other type of mobile machine that has the energy transfer port 110 positioned at the front of the machine 102, the energy transfer arm 108 can extend behind the service vehicle 104 and be connected to the front of the machine 102, such that the service vehicle 104 can travel ahead of the machine 102. In other examples, the service vehicle 104 can be a trailing machine that travels behind the machine 102 during travel in a convoy formation. For instance, if the machine 102 is a wheel loader or other type of mobile machine that has the energy transfer port 110 positioned at the back of the machine 102, the energy transfer arm 108 can extend in front of the service vehicle 104 and be connected to the back of the machine 102, such that the service vehicle 104 can travel behind the machine 102. In still other examples, the service vehicle 104 and the machine 102 can travel side by side, or in any other position relative to one another, during travel in a convoy formation.

The service vehicle 104 and the machine 102 can be configured to attempt to stay at a target separation distance 128 apart during travel in a convoy formation, such that, during convoy travel, the energy transfer arm 108 can remain connected to the machine 102 and the electrical connection between the service vehicle battery 112 and the machine 102 can be maintained. The target separation distance 128 can be a substantially fixed distance between the service vehicle 104 and the machine 102. In some examples, the target separation distance 128 can be determined based on a radius of motion of an element of the energy transfer arm 108, a midpoint between fully collapsed and fully extended positions of the energy transfer arm 108, braking capacities or corresponding stopping distances associated with the machine 102, and/or other factors.

Although the service vehicle 104 and the machine 102 can attempt to stay at a target separation distance 128 apart during travel in the convoy formation, the actual distance between the service vehicle 104 and the machine 102 to vary at least slightly, for instance within a predefined tolerance range of the target separation distance 128, during convoy travel without disconnecting the energy transfer arm 108, For example, moveable elements of the energy transfer arm 108 relative to the service vehicle 104 and/or the machine 102, elements of the energy transfer arm 108 that allow the length of the energy transfer arm 108 to be adjusted, a reel that can extend and retract the cable 126, slack portions of the cable 126, and/or other elements of the energy transfer arm 108 can allow the actual distance between the service vehicle 104 and the machine 102 to vary to at least some degree without causing a disconnect of the energy transfer arm 108.

In some examples, the machine 102 and the service vehicle 104 can use machine-to-machine communications to share speed information, steering information, braking information, and/or other operation data such that the machine 102 and the service vehicle 104 can coordinate their respective driving operations to attempt to maintain the target separation distance 128 between the machine 102 and the service vehicle 104 while traveling in a convoy formation. In other examples, the service controller 118 can receive operation data associated with one or both of the machine 102 or the service vehicle 104. Based on the operation data, the service controller 118 can send instructions to autonomously control the machine 102 and/or the service vehicle 104, to coordinate driving operations of the machine 102 and the service vehicle 104 such that the target separation distance 128 can be maintained between the machine 102 and the service vehicle 104 during convoy travel.

In still other examples, the trailing machine in the convoy formation can use cameras and/or other sensors, such as the machine sensors 120 if the machine 102 is the trailing machine or the service vehicle sensors 122 if the service vehicle 104 is the trailing machine, to monitor a position, speed, and/or other attributes of the leading machine during convoy travel. Accordingly, the trailing machine can use sensor data to track the leading machine, and adjust speed, steering, and other operations of the trailing machine to attempt to maintain the target separation distance 128 between the machine 102 and the service vehicle 104 during convoy travel so that the energy transfer arm 108 can remain connected to the machine 102. The trailing machine can also use brake capability information to determine a currently available braking capacity of the machine 102 during convoy travel, and use the currently available braking capacity of the machine 102 to determine adjustments to speed, steering, and other machine operations during convoy travel. In some examples, an ECM of the trailing machine can use a rules-based model, a dynamic model, a machine learning model that has been trained on a historical data set of operations of similar machines and service vehicles in similar situations, and/or other models to determine adjustments to speed, steering, and other machine operations that are predicted to maintain the target separation distance 128 and prevent a disconnection of the energy transfer arm 108.

In some examples in which the service vehicle 104 is the leading machine, the service vehicle 104 can have painted sections, decals, or other markings configured to be detected and recognized by the machine sensors 120, such that the machine 102 can follow the service vehicle 104 in a convoy formation at least in part based on optical recognition of the markings on the service vehicle 104. In other examples, the machine 102 can have such markings, and the service vehicle 104 can be configured to follow the machine 102 in a convoy formation at least in part based on optical recognition of the markings on the machine 102.

Although the service vehicle 104 and the machine 102 can take actions to attempt to stay at the target separation distance 128 apart during travel in a convoy formation, the energy transfer arm 108 may become disconnected from the service vehicle 104 during convoy travel in some situations. For example, if the target separation distance 128 between the machine 102 and the service vehicle 104 is not maintained during convoy travel due to unanticipated terrain conditions, due to movement of one of the machines in the convoy formation that is not anticipated by the other machine, or for any other reason, the energy transfer arm 108 may become disconnected from the service vehicle 104. The machine 102 can cease receiving energy from the service vehicle battery 112 upon the disconnection of the energy transfer arm 108, such that the service vehicle 104 may again become at least partially disabled and unable to operate based on energy from the machine battery 106. In response to a disconnection of the energy transfer arm 108, the machine 102 can be configured to, apply one or more of the brake systems 114 to slow and/or stop the machine 102. As discussed above, even if one or more of the brake systems 114 is fully or partially inoperable due to issues with the brake system or the machine battery 106, one or more of the other brake systems 114 may have remaining braking capacity and be able to slow and/or stop the machine 102. For instance, if the machine 102 has lost regenerative braking capacity, the machine 102 may still be able to use service brakes to stop movement of the machine 102 if the energy transfer arm 108 is disconnected from the machine 102.

As discussed further below with respect to FIG. 2 and FIG. 3, the service controller 118, the service vehicle 104, and/or the machine 102 can plan a route for the convoy travel of the machine 102 and the service vehicle 104. The service controller 118, the service vehicle 104, and/or the machine 102 can determine a path for the route that minimizes the chances of the energy transfer arm 108 disconnecting from the machine 102, and/or that minimizes risks associated with the machine 102 in the event that such a disconnection does occur during travel along the route.

Figure 2:
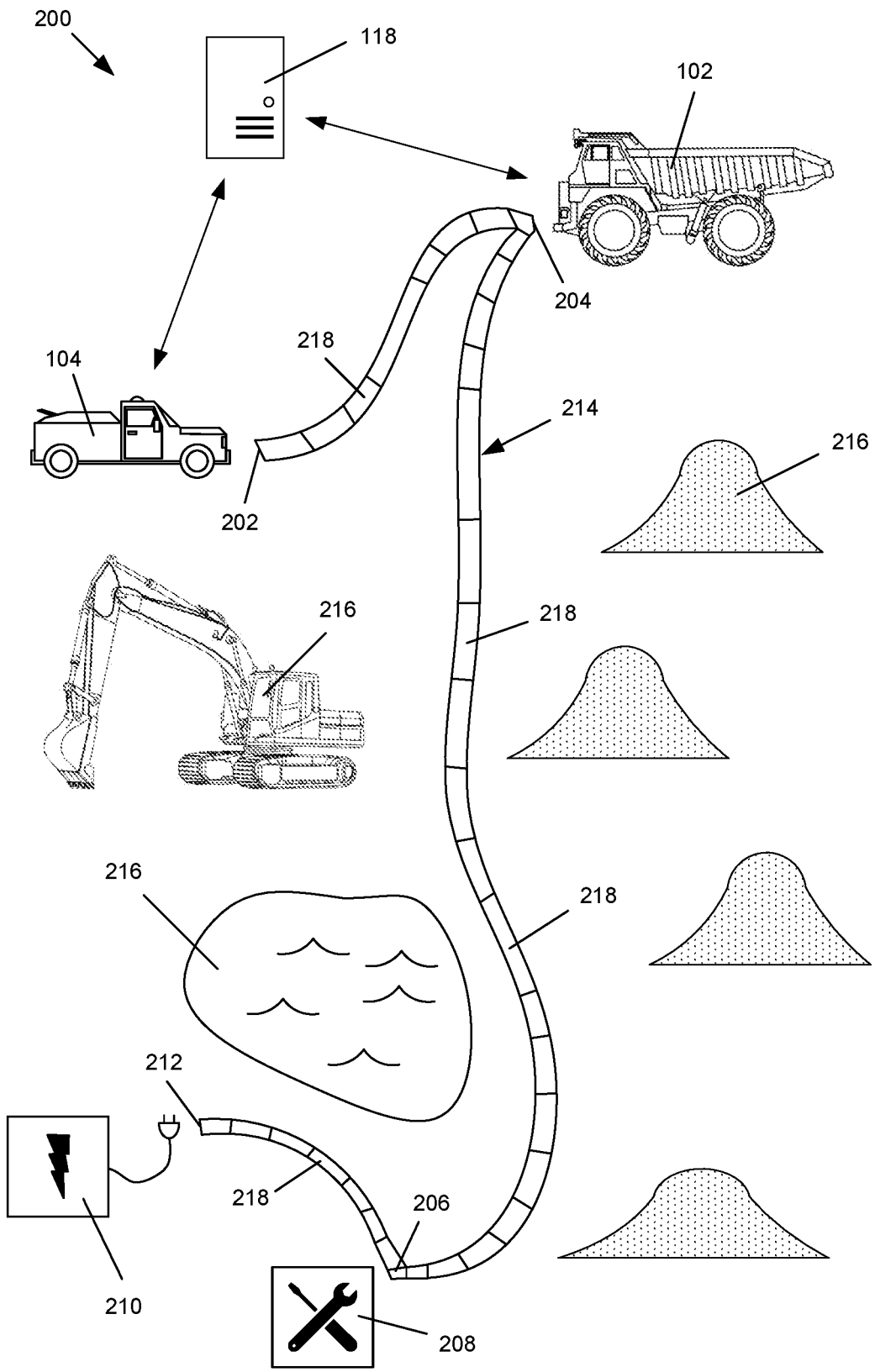
FIG. 2 shows an example of a worksite associated with the machine, the service vehicle, and a service controller.

FIG. 2 shows an example of a worksite 200 associated with the machine 102, the service vehicle 104, and the service controller 118. If the machine 102 becomes fully or partially disabled due to an issue that prevents the machine 102 from operating based on energy provided by the machine battery 106, the service vehicle 104 can travel from a first location 202 on the worksite 200 to a second location 204 of the machine 102, such that the service vehicle 104 can attach the energy transfer arm 108 to the machine 102 at the second location 204. For example, the service vehicle 104 can begin providing energy to the machine 102, or receiving energy from the machine 102, via the energy transfer arm 108 at the second location 204.

The machine 102 and the service vehicle 104 can travel together, in a convoy formation, from the second location 204 to a third location 206 on the worksite 200. In some examples, the service vehicle 104 can provide energy to the machine 102 while the service vehicle 104 and the machine 102 travel together in the convoy formation, such that the machine 102 can operate based on energy received from the service vehicle 104 during travel from the second location 204 to the third location 206. In other examples, the service vehicle 104 can receive energy from the machine 102 while the machines travel together in the convoy formation. For instance, if the regenerative brake system of the machine 102 is able to capture energy, but the machine battery 106 is unable to be charged by the energy captured by the regenerative brake system, the machine 102 can use the energy transfer arm 108 to transfer the energy captured by the regenerative brake system to the service vehicle battery 112 during convoy travel from the second location 204 to the third location 206.

In some examples, the third location 206 can be associated with a maintenance station 208. The maintenance station 208 can, in some examples, be a location or facility where maintenance and/or repair can be performed on the machine 102 to resolve the issue that prevented the machine 102 from operating based on energy provided by the machine battery 106. In other examples, the maintenance station 208 can be a location where the machine 102 can be parked at least temporarily, for instance until a tow truck can transport the machine 102 to another location, or maintenance workers can inspect and/or work on the machine 102.

In other examples, the third location 206 can be a charging station 210 where the machine 102 can charge the machine battery 106, and/or the service vehicle 104 can charge the service vehicle battery 112. In some examples, the charging station 210 can be a fixed charging station located at a particular location on the worksite 200. In other examples, the charging station 210 can be a system of electrified trolley lines that extend through the worksite 200. Accordingly, if the machine 102 has become disabled because an issue prevented the machine 102 from accessing energy from the trolley lines, the service vehicle 104 can be dispatched to provide energy to the machine 102 during convoy travel until the machine 102 reaches trolley lines and can attach a pantograph to the trolley lines to receive energy from the trolley lines.

After the service vehicle 104 has traveled with the machine 102 to the third location 206, the service vehicle 104 can disconnect the energy transfer arm 108 from the machine 102. In some examples, the service vehicle 104 can travel to a charging station 210 configured to charge the service vehicle battery 112. For instance, if energy stored in the service vehicle battery 112 was depleted while the service vehicle 104 traveled with the machine 102 and provided energy to the machine 102, the service vehicle 104 can travel to the charging station 210 to recharge the service vehicle battery 112.

In some examples, the charging station 210 can be located at or near the maintenance station 208, at the third location 206. In other examples, the charging station 210 can be located at the first location 202 on the worksite 200, from which the service vehicle 104 was originally dispatched. In still other examples, the charging station 210 can be located at a fourth location 212 on the worksite, as shown in FIG. 2.

In some examples, the service controller 118 can plan a route 214 through the worksite 200 for the service vehicle 104 and/or the machine 102, such that the service vehicle 104 can assist the machine 102 during travel to a destination. The destination can be the maintenance station 208, the charging station 210, or any other location on the worksite 200. The service controller 118 can, for example, use a site map of the worksite 200 to determine the route 214 from the first location 202 to the second location 204, and from the second location 204 to the third location 206. In some examples, the route 214 can extend further from the third location 206 to the fourth location 212, back to the first location 202, or to any other location on the worksite 200.

The site map can indicate terrain of the worksite 200, locations and/or identities of obstacles 216 on the worksite 200, locations of the machine 102 and the service vehicle 104 on the worksite 200, ground types and/or ground conditions associated with portions of the worksite 200, and/or other information associated with the worksite. For instance, the site map can indicate positions of fixed and/or movable obstacles 216 on the worksite, such as other machines, personnel, lakes, ponds, rivers, cliff faces, hills, roads, intersections, mounds of dirt, gravel, or other material, and/or other types of objects, terrain features, or obstacles. The site map can also indicate grades or slopes of portions of the worksite 200, such as incline levels or decline levels associated with portions of the worksite 200. Accordingly, the service controller 118 can use the site map to plan the route 214 such that the service vehicle 104 and the machine 102 can avoid obstacles 216 while following the route 214, can travel over terrain that is navigable for the machines, can avoid sharp turns or other movements that may lead to a disconnection of the energy transfer arm 108 from the machine 102 during convoy travel, and/or can otherwise follow the route 214.

In some examples, the service controller 118 can also generate the route 214, and/or dispatch the machines to travel along the route 214, based on current traffic conditions on the worksite 200 and/or historical traffic patterns associated with the worksite 200 indicated by the site map or other data. For example, if the machine 102 requests assistance from the service vehicle 104 in the afternoon when traffic on the worksite 200 is currently, or normally, relatively high, the service controller 118 may delay dispatching the service vehicle 104 to assist the machine 102 until a later point in time that is associated with less traffic.

The route 214 can be divided into segments 218. An individual segment can be a portion of the route 214 that has the same or similar attributes, such as a same or a similar incline level or decline level, a same or similar direction or orientation through the worksite 200, a same or similar ground type, or any other shared attributes. As an example, the portion of the route 214 that extends from second location 204 to the third location 206 can have multiple segments, such as a first segment that declines at a consistent angle, a second segment that is substantially flat without an incline or a decline, and a third segment that inclines at a consistent angle. The service controller 118 can define the route 214 and its segments 218 based in part on terrain information indicated by the site map, for instance based on grade information associated with the terrain of the worksite 200.

The service controller 118 can also generate the route 214 and its segments 218 in part by selecting a safest path for the machine 102, the service vehicle 104, and/or other machines and personnel on the worksite 200. For example, the service controller 118 can be configured to prioritize selecting segments 218 of the route 214 that extend along wide haul roads or other wide navigable areas of the worksite 200, that do not pass within threshold distances of current locations other machines or personnel, that are associated with low traffic levels, that avoid intersections, that are relatively flat, that avoid sharp curves, that minimize overall travel time, and/or that otherwise enhance safety and reduce the chances of collisions, disconnections of the energy transfer arm 108, or other safety incidents during convoy travel.

The service controller 118 can predict, estimate, or determine operations of the service vehicle 104 and/or the machine 102 that will be performed at individual segments 218 of the route. For example, based on a length and grade of a particular segment, weights of the service vehicle 104 and/or the machine 102, and/or other factors, the service controller 118 can determine whether the service vehicle 104 and/or the machine 102 will likely need to brake while traveling through the segment, accelerate through the segment, and/or perform other operations to traverse the segment. Based on differences between horsepower levels, wheel sizes, braking capabilities, weights, turn radiuses, and/or other attributes of the service vehicle 104 and the machine 102, the service vehicle 104 and the machine 102 may perform different operations, or perform the same operations to different degrees, while traveling through a particular segment together in a convoy formation and being separated by the target separation distance 128. Accordingly, the service controller 118 can take such differing aspects of the service vehicle 104 and the machine 102 into account when predicting, estimating, or determining machine operations associated with individual segments 218.

As an example, the service controller 118 can generate a first set of autonomous travel instructions for the machine 102 to traverse a particular segment of the route 214, and generate a second set of autonomous travel instructions for the service vehicle 104 to traverse the same particular segment of the route 214. The first set of autonomous travel instructions and the second set of autonomous travel instructions may differ in one or more ways, for instance by causing the machine to perform different operations or to perform the same operations to different degrees. However, the first set of autonomous travel instructions and the second set of autonomous travel instructions can configure the machine 102 and the service vehicle 104 to travel through the particular segment in a coordinated manner at substantially the same speed, such that the target separation distance 128 between the machine 102 and the service vehicle 104 can be maintained during convoy travel to avoid disconnecting the energy transfer arm 108.

The service controller 118 can also be configured to consider energy consumption and/or battery SoH information associated with the service vehicle 104 and/or the machine 102 when predicting, estimating, or determining machine operations associated with individual segments 218 or the route 214 overall. For example, the service controller 118 can predict a SoC the service vehicle battery 112 will have when the service vehicle 104 enters a particular segment, for instance based on energy expected to be consumed by the service vehicle 104 before the service vehicle 104 reaches the particular segment, or energy captured by regenerative braking operations the service vehicle 104 is expected to perform before reaching the particular segment. The service controller 118 can also predict amounts of energy that will be consumed by or provided to the service vehicle battery 112 during travel through the particular segment, for instance based on energy expected to be transferred from the service vehicle battery 112 to the machine 102 during expected machine operations of the machine 102, energy expected to be received by the service vehicle battery 112 from the machine 102, and/or machine operations of the service vehicle 104 and/or the machine 102 that may charge or drain the service vehicle battery 112.

Accordingly, the service controller 118 can generate the route 214 by determining a path through the worksite 200 that allows the service vehicle 104 to travel to the machine 102, and transfer energy to and/or from the machine 102 during convoy travel to the maintenance station 208, such that enough stored energy remains in the service vehicle battery 112 for the service vehicle 104 to travel to the charging station 210 or to perform additional operations to assist another machine. In some examples, the service controller 118 can also generate the route 214 in part by determining or predicting machine operations that the service vehicle 104 and/or the machine 102 are to perform during the route, for instance based on predicted energy consumption levels associated with the machine operations.

Predicted energy consumption levels associated with individual segments 218 or machine operations can be positive or negative. For example, a segment can be associated with a positive energy consumption level if the segment has an uphill grade and electric components of the machines would consume energy to propel the machines uphill through the segment. As another example, a segment can be associated with a negative energy consumption level if the segment has a downhill grade and regenerative brake systems of one or both machines would capture energy to be stored in the service vehicle battery 122 as the machines brake to control speed while traveling downhill through the segment.

The service controller 118 can determine expected energy consumption levels associated with segments 218 based on based on physics models, machine learning models, or other models indicating amounts of energy likely to be consumed and/or captured based on grades and/or distances of the segments 218, weights and other attributes of the machine 102 and the service vehicle 104, weight of a payload carried by the machine 102, braking capabilities available to the machine 102 and the service vehicle 104, and/or other factors. For example, based on a length and grade of a segment indicated by a site map, the service controller 118 can determine whether the machines will likely need to brake while traveling through the segment, accelerate through the segment, and/or perform other operations to traverse the segment. The service controller 118 can accordingly determine whether the machines will consume a positive amount of energy to travel through the segment, or will consume a negative amount of energy to travel through the segment because regenerative brake systems of one or both machines are predicted to capture energy and/or charge the machine battery 112 as the machines brake or decelerate through the segment. In some examples, energy consumption levels can be determined by a machine learning model that has been trained on historical data indicating energy consumption levels associated with traversal of terrain by the machine 102, the service vehicle 104, or similar machines through segments 218 associated with one or more grades and/or distances.

In some examples, the service controller 118 can generate or adjust the route 214, and/or machine operations to be performed along the route 214, to minimize or otherwise control expected energy consumption levels associated with the route 214. For example, as discussed above, the service controller 118 may generate the route 214 in part by prioritizing travel through downhill segments 218, such that a regenerative brake system of the machine 102 can capture energy and reduce overall expected energy consumption levels associated with the route 214. As another example, the service controller 118 can determine that the machine 102 should dump at least a portion of a payload carried by the machine 102 in order to decrease a weight of the machine 102 and thereby reduce overall expected energy consumption levels associated with the route 214.

The service controller 118 can define maximum speeds for some or all of the segments 218 of the route 214. For portions of the route 214 that the service vehicle 104 will travel alone, such as from the first location 202 to the second location 204, and/or from the third location 206 to the fourth location 212, the service controller 118 may define maximum speeds of segments 218 based on capabilities or attributes of the service vehicle 104 alone, or may avoid defining maximum speeds for those segments 218. However, for portions of the route 214 that the service vehicle 104 and the machine 102 will travel together in a convoy formation, for instance from the second location 204 to the third location 206, the service controller 118 may define maximum speeds of segments 218 based on capabilities or attributes of both the service vehicle 104 and the machine 102.

In some examples, the service controller 118 can define a maximum speed of a particular segment of the route 214 by determining a speed from which the machine 102 can safely stop, for instance based on an incline or decline associated with the segment and braking capabilities that are predicted to remain available to the machine 102 if the energy transfer arm 108 were to become disconnected from the machine 102 during travel through the segment. Accordingly, during convoy travel, the machine 102 and the service vehicle 104 can travel at or below the defined maximum speed for each of the segments 218 to reduce or eliminate a risk of the machine 102 being unable to stop if the energy transfer arm 108 were to unexpectedly become disconnected from the machine 102.

In some examples, the service controller 118, the service vehicle 104, and/or the machine 102 can notify other machines and/or personnel on the worksite 200 that the service vehicle 104 and/or the machine 102 are, or will be, following the route 214. As an example, if any other machines are present on the worksite 200 on or near portions of the route 214, the service controller 118 can notify the other machines that the service vehicle 104 and/or the machine 102 will be traveling along the route 214, and/or issue instructions to the other machines that cause the other machines to autonomously move away from the route 214 to clear a path for the service vehicle 104 and/or the machine 102. As another example, the service vehicle 104 and/or the machine 102 can transmit alerts to other nearby machines or personnel indicating that the service vehicle 104 and/or the machine 102 are traveling along the route 214. Accordingly, other machines and personnel can be notified to clear a path for the service vehicle 104 and/or the machine 102 along the route 214, for instance to reduce or eliminate the risk of the machine 102 colliding with other machines in the event that the energy transfer arm 108 becomes disconnected and operations of the machine 102 that were powered via the energy transfer arm 108 become disabled.

In some examples, the machine 102 and/or the service vehicle 104 can normally be associated with a standard safety bubble, with a standard radius, on the worksite 200 to prevent other machines or personnel from coming close to the machines. However, when the machine 102 and the service vehicle 104 are connected by the energy transfer arm 108 and are traveling in a convoy formation, the radius of the safety bubble can be expanded to cause other machines and personnel to stay farther away from the machines.

In some examples, the machine 102 can be experiencing an issue that can be resolved at the maintenance station 208 if the SoC of the machine battery 106 is at a certain target SoC. The target SoC can be a specific SoC level considered to be optimal for a service operation to be performed on the machine 102, a minimum SoC level for the service operation, a maximum SoC level for the service operation, a range of SoC levels that are considered to be optimal for the service operation, or any other specific SoC level or range of SoC levels. Some service operations can be associated with higher target SoC levels than other service operations.

Accordingly, in some examples, the service controller 118 can plan the route 214 for the service vehicle 104 and the machine 102, and the operations to be performed those machines at individual segments 218 of the route 214, such that the service controller 118 predicts that the machine 102 will arrive at the maintenance station 208 with the machine battery 106 at a SoC that satisfies the target SoC for a particular service operation to be performed on the machine 102. The service controller 118 can have a table or database of predefined target SoC levels that correspond with various service operations. Accordingly, the service controller 118 can determine, based on an indication of a fault or other issue being experienced by the machine 102, determine a particular service operation that may resolve that fault or other issue, and use the table or database to determine the target SoC that corresponds with the particular service operation to be performed on the machine 102.

In some examples, the service controller 118 may determine that the machine battery 106 would arrive at the maintenance station 208 with an SoC that is higher than a target SoC for a service operation. In these examples, the service controller 118 can dispatch the service vehicle 104 to travel with the machine 102 and receive energy from the machine battery 106 during the convoy travel, such that the machine battery 106 is drained to the target SoC by the time the machines arrive at the maintenance station 208. The service controller 118 can also, or alternately, instruct the machine 102 to activate one or more parasitic systems to drain the machine battery 106 more quickly, for instance by turning on lights, by activating or turning up heating and/or cooling systems, by turning on fans or increasing fan speeds, by turning on hydraulic systems, or by activating other elements that consume energy.

In some examples, the machine 102 may not be disabled, but the service controller 118 may predict that if the machine 102 traveled to the maintenance station alone, the machine battery 106 would arrive at the maintenance station 208 with an SoC that is higher than a target SoC for a particular maintenance operation that is to be performed on the machine 102. Accordingly, in this example, the service controller 118 can dispatch the service vehicle 104 to travel with the machine 102 in a convoy formation, such that the machine 102 transfers energy to the service vehicle battery 112 via the energy transfer arm 108 during convoy travel. Such energy transfer can drain the machine battery 106 to the target SoC during convoy travel. The service controller 118 can also instruct the machine to consume additional energy during travel by activating one or more parasitic systems, as discussed above, to drain the machine battery 106 more quickly during convoy travel. The service controller 118 can plan the route 214, and/or machine operations along the route 214, such that the SoC of the machine battery 106 is drained during travel and will have an SoC that satisfies the target SoC for a maintenance operation when the machines reach the maintenance station 208.

In other examples, if the machine battery 106 initially has a SoC that is lower than the target SoC of the maintenance operation, the service controller 118 can plan the route 214 for the machine 102 and the service vehicle 104, and/or machine operations along the route 214, such that the SoC of the machine battery 106 will be increased to satisfy the target SoC of the maintenance operation when the machine 102 reaches the maintenance station 208. For instance, if the machine battery 106 initially has a SoC that is lower than the target SoC of a maintenance operation, the service controller 118 can dispatch the service vehicle 104 to provide energy to the machine battery 106 during convoy travel, such that the machine battery 106 is charged to the target SoC by the time the machines reach the maintenance station 208.

In some examples, the service controller 118 can plan the route 214 and/or machine operations to manage the SoC of the service vehicle battery 112, for instance to cause an SoC of the service vehicle battery 112 to be drained or charged to a target SoC by the time the service vehicle 104 reaches the machine 102, or reaches a particular segment of the route 214. For example, when the service controller 118 receives a request to dispatch the service vehicle 104 to assist the machine 102, the service vehicle battery 112 may be fully charged. However, the service controller 118 may receive information indicating that a regenerative brake system of the machine 102 is capable of capturing energy but is unable to store the energy in the machine battery 106. The service controller 118 can accordingly plan the route 214, and/or operations of the service vehicle 104 along the route 214, such that the operations of the service vehicle 104 are expected to drain the service vehicle battery 112 to a target SoC by the time the service vehicle 104 reaches the machine 102 and thereby free up capacity of the service vehicle battery 112 to store energy captured by the regenerative brake system of the machine 102.

For example, the service controller 118 can instruct the service vehicle 104 to perform more operations than might otherwise be typical, to use a resistive grid to dissipate energy stored in the service vehicle battery 112, and/or to activate one or more lights, heating systems, cooling systems, hydraulic systems, or other parasitic systems, to drain the service vehicle battery 112 more quickly than would otherwise be desired. Such operations of the service vehicle 104 can, for example, free up energy storage capacity in the service vehicle battery 112 so that the service vehicle battery 112 has capacity to store energy captured by the regenerative brake system of the machine 102 when the machines travel in a convoy formation.

As another example, if the service controller 118 expects the service vehicle 104 and/or the machine 102 to perform regenerative braking operations during a particular segment of the route 214, the service controller 118 may instruct the service vehicle 104 and/or the machine 102 to perform one or more operations and/or to turn on parasitic systems to intentionally drain the service vehicle battery 112 before the service vehicle 104 and/or the machine 102 reaches that segment. For instance, a particular segment of the route 214 may involve downhill travel. The service controller 118 can predict that regenerative braking of the service vehicle 104 and/or the machine 102 during travel through the downhill segment is expected to capture a particular amount of energy. Accordingly, the service controller 118 can instruct the service vehicle 104 and/or the machine 102 to perform operations expected to drain at least that particular amount of energy from the service vehicle battery 112 during travel through one or more earlier segments of the route 214 before reaching the downhill segment. Such operations can free up storage capacity in the service vehicle battery 112, such that the service vehicle battery 112 can be charged by the energy expected to be captured by regenerative braking during the downhill segment.

Overall, the service controller 118 can plan the route 214, and/or operations of the service vehicle 104 and/or machine 102, as described above. An example process that the service controller 118 can use to plan the route 214 and dispatch the service vehicle 104 to assist the machine 102 is described further below with respect to FIG. 3. However, in other examples, the service vehicle 104 and/or the machine 102 can fully or partially plan the route 214 and/or operations associated with the route 214. For example, the service controller 118 may plan the route 214 and indicate target state of charge levels for the service vehicle battery 112 at one or more segments 218 of the route 214. However, the service vehicle 104 may autonomously determine operations to travel through the route 214, and/or to drain or charge the service vehicle battery 112 to the target state of charge levels associated with the segments 218.

Figure 3:
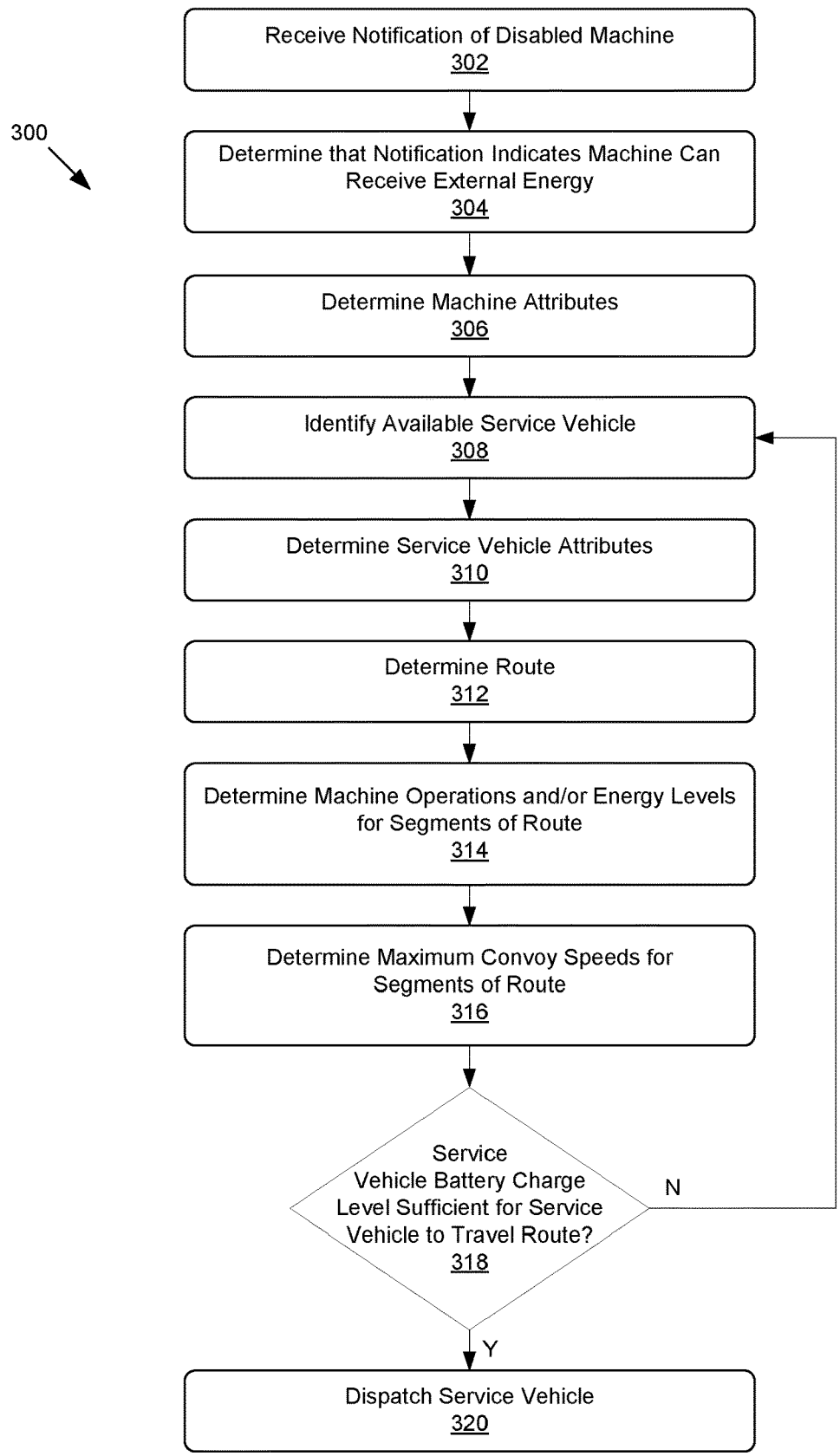
FIG. 3 shows a flowchart illustrating an example process for dispatching the service vehicle to assist the machine.

FIG. 3 shows a flowchart 300 illustrating an example process for dispatching the service vehicle 104 to assist the machine 102. At block 302, the service controller 118 can receive a notification that the machine 102 has become fully or partially disabled. The notification can request that a service vehicle be dispatched to provide energy to the machine 102. In some examples, the machine 102 can use wireless communication interfaces 116 to transmit the notification to the service controller 118.

At block 304, the service controller 118 can determine that the notification received at block 302 indicates that the machine 102 can receive external energy. For example, the notification can include a fault code or other information indicating that the machine 102 may be operable based on power received from the service vehicle 104, and is not disabled due to an issue that would entirely prevent operations of the machine 102. In other examples, the service controller 118 can determine that the notification also, or instead, indicates that the machine 102 is unable to store energy it captures via a regenerative brake system, but that the machine 102 is able to output the captured energy to an external system such as a service vehicle. Accordingly, the service controller 118 can determine that a service vehicle can be dispatched to assist the machine 102 by providing energy to the machine 102 and/or receiving energy from the machine 102.

At block 306, the service controller 118 can determine attributes of the machine 102. In some examples, the service controller 118 can determine attributes of the machine 102 based on information provided in the notification received at block 302. For example, the notification from the machine 102 may indicate a location of the machine 102, battery SoH information associated with the machine battery 106, indications of braking capabilities that remain available to the machine 102, an indication of a type of the energy transfer port 110 of the machine 102, and/or other information associated with the machine 102. The service controller 118 can also, or alternately, determine attributes of the machine 102 based on a stored profile associated with a model type of the machine 102, based on previous information sent to and/or received from the machine 102, and/or based on any other data.

At block 308, the service controller 118 can identify a service vehicle that is available to assist the machine 102. In some examples, a fleet of service vehicles may be present on a worksite, and/or be within driving range of the machine 102. The service controller 118 can determine which of those service vehicles are not currently busy or assigned to assist other machines, are closest to the location of the machine 102, and/or are otherwise available to travel to the machine 102 and provide energy to the machine 102. For example, at block 306, the service controller 118 can determine that the service vehicle 104 is available to assist the machine 102. In other examples, the service vehicle 104 may be the only service vehicle present on the worksite or within range of the machine 102, and the service controller 118 can verify at block 308 that the service vehicle 104 is available to assist the machine 102.

At block 310, the service controller 118 can determine attributes of the service vehicle 104. For example, the service controller 118 use wireless communications to request, from the service vehicle 104, current information indicating a location of the service vehicle 104, battery SoH information associated with the service vehicle battery 112, and/or other information associated with the service vehicle 104. The service controller 118 can also, or alternatively, determine attributes of the service vehicle 104 based on a stored profile associated with a model type of the service vehicle 104, based on previous information sent to and/or received from the service vehicle 104, and/or based on any other data.

At block 312, the service controller 118 can determine the route 214 for the service vehicle 104. The route 214 can include a first portion that the service vehicle 104 will travel from the current location of the service vehicle 104 to the current location of the machine 102. The route 214 can also include a second portion that the service vehicle 104 and the machine 102 will travel together, in a convoy formation while the service vehicle 104 provides energy to the machine 102, from the current location of the machine 102 to the maintenance station 208 or another destination. In some examples, the route 214 can also include a third portion that the service vehicle 104 will travel from the maintenance station 208 or other destination to the charging station 210 or another location.

In some examples, the service controller 118 can determine the route 214 at block 312 based on a site map that indicates terrain information associated with a worksite, and/or information about locations of obstacles 216 on the worksite, such as other machines, personnel, and/or terrain features. For instance, the service controller 118 can plan the route 214 to follow a path through the worksite that is navigable for the service vehicle 104 and the machine 102, based on the attributes of the service vehicle 104 and the machine 102 determined at blocks 306 and 310, and that avoids obstacles 216 on the worksite. The service controller 118 can also divide the route 214 into segments 218 at block 312, or determine individual segments 218 that are navigable for the service vehicle 104 and the machine 102 and assemble the route 214 from the individual segments 218. The service controller 118 can, for example, determine locations of the segments 218, travel directions associated with the segments 218, grades of the segments 218, such as incline or decline angles, and/or other attributes of the segments 218.

At block 314, the service controller 118 can determine machine operations, and/or energy levels, associated with segments 218 of the route 214. For example, the service controller 118 can predict or determine machine operations the service vehicle 104 and/or the machine 102 will perform to traverse individual segments 218 of the route 214, such as steering operations, acceleration operations, braking operations, and/or other machine operations. The service controller 118 can also predict energy levels that will be consumed and/or captured by machine operations of the service vehicle 104 and/or the machine 102 while one or both machines traverse individual segments 218. In various examples, the service controller 118 can use the machine operations and/or energy levels determined at block 314 to generate autonomous machine instructions for the service vehicle 104 and/or the machine 102, determine levels of energy to be transferred to and/or from the service vehicle battery 112 during convoy travel through individual segments 218, predict a charge level of the service vehicle battery 112 at one or more of the segments 218, determine whether the service vehicle 104 should perform additional machine operations and/or activate parasitic systems to free up energy storage capacity in the service vehicle battery 112 before a particular segment of the route 214, determine whether the machine 102 should perform machine operations and/or activate parasitic systems to drain the machine battery 106 before arriving at the maintenance station 208, and/or otherwise determine or predict machine operations and/or attributes of the service vehicle 104 and/or the machine 102 at individual segments 218 of the route 214, or in association with the route 214 overall.

At block 316, the service controller 118 can determine convoy speeds for segments 218 of the route 214. As discussed above, although the machine 102 may be unable to perform some operations based on energy from the machine battery 106, the machine 102 may have access to some reserve power from backup batteries, from certain strings or packs of the machine battery 106 that are still functional, or from other auxiliary power that would allow one or more of the brake systems 114 to slow and stop the machine 102 if the machine 102 were disconnected from the service vehicle 104 during convoy travel. Accordingly, at block 316 the service controller 118 can determine what braking capabilities would be available to the service vehicle 104 if such a disconnection were to occur within individual segments 218. The service controller 118 can also determine slopes, such as incline angles or decline angles, associated with individual segments 218. Based on the expected available braking capability of the machine 102 at a segment, an incline or decline angle of the segment, weights of one or both machines, a payload carried by the machine 102, and/or other factors, the service controller 118 can determine a maximum speed from which the machine 102 could stop using its expected available braking capability. The service controller 118 can accordingly instruct the service vehicle 104 and/or the machine 102 to travel through particular segments 218 at speeds that are at or below the maximum speed for each segment determined at block 316.

At block 318, the service controller 118 can use the information determined from blocks 310 to 316 to determine whether the current SoC of the service vehicle battery of the available service vehicle identified at block 308 would allow the service vehicle 104 to travel through the route 214. For example, based on a current charge level of the service vehicle battery 112, energy expected to be consumed and/or captured by operations of the service vehicle 104 while traveling through the route 214, and energy expected to be transferred to and/or received from the machine 102 while traveling through the route 214, the service controller 118 can determine whether the service vehicle 104 is likely to be able to travel to the machine 102, travel with the machine to the maintenance station 208, and travel to the charging station 210 without the service vehicle battery 112 becoming fully discharged. In some examples, the service controller 118 can determine whether the service vehicle battery 112 currently stores at least 10% more energy, or any other threshold amount of extra energy, than is expected to be used while the service vehicle 104 travels through the route 214.

If the service controller 118 determines that the service vehicle battery 112 of the service vehicle 104 is currently charged to a level that is likely to allow the service vehicle 104 to complete travel through the route 214 (Block 31—Yes), the service controller 118 can dispatch the service vehicle 104 at block 320. For example, the service controller 118 can transmit autonomous machine instructions to the service vehicle 104 that cause the service vehicle 104 to automatically travel through the route 214, transmit navigation instructions that a human operator of the service vehicle 104 can follow via a GPS navigation system or other navigation system, or otherwise cause the service vehicle 104 to follow the route 214. Accordingly, the dispatched service vehicle 104 can travel along the route 214 from a current location to a location of the machine 102, attach the energy transfer arm 108 to the machine 102, transfer energy to and/or from the machine as the service vehicle 104 and the machine 102 travel together in a convoy formation to the maintenance station 208, and/or travel to the charging station 210 or other location.

If the service controller 118 determines that the service vehicle battery 112 of the service vehicle 104 is not currently charged to a level that is likely to allow the service vehicle 104 to complete travel through the route 214 (Block 318—No), the service controller 118 can return to block 308 to identify a different service vehicle that may be able to complete travel through the route 214 or a different route planned for that service vehicle. The service controller 118 can also, or alternately, adjust the path of the route 214 or machine operations to perform along the route 214, for instance to include different segments 218, to lower the expected energy consumption associated with traveling through the route 214, or alter other aspects of the route 214.

In some examples, the service controller 118 can perform one or more of the blocks of FIG. 3 substantially concurrently, or in a different order than shown in FIG. 3. For example, the service controller 118 may determine at block 314 and/or 316 that a grade of a particular segment is too steep for expected braking capabilities of the machine 102. Accordingly, based on that determination, the service controller 118 may adjust the path of the route 214 at block 312 to avoid the segment that is too steep for the machine 102.

Figure 4:
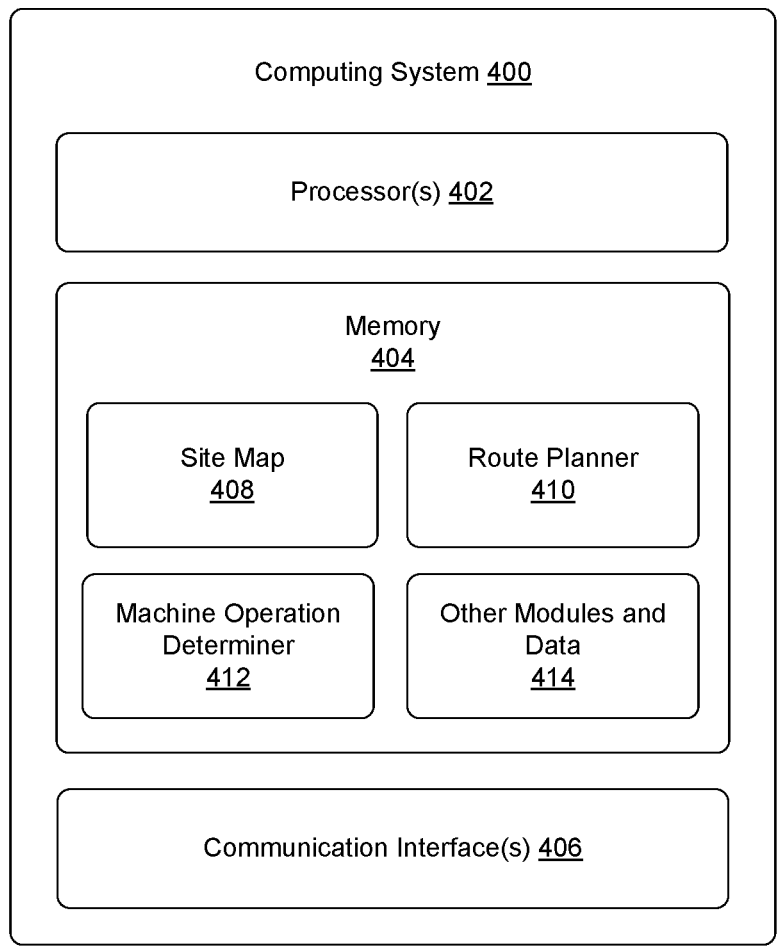
FIG. 4 shows an example system architecture for a computing system.

In some examples, the operations shown in FIG. 3 can be performed by the service controller 118, as discussed above. In other examples, one or more of the operations shown in FIG. 3, or related operations, can also or alternately be performed by the service vehicle 104 and/or the machine 102. For instance, although the service controller 118 may determine the route 214 at block 312, the service vehicle 104 and/or the machine 102 may determine specific machine operations associated with segments 218 of the route 214 before the service vehicle 104 is dispatched at block 320, or while traveling on the route 214. FIG. 4, discussed further below, describes an example system architecture for a computing system, such as the service controller 118 or an ECM or other computing system on-board the service vehicle 104 or the machine 102, that can perform some or all of the operations of FIG. 3.

FIG. 4 shows an example system architecture for a computing system 400. In some examples, the computing system 400 can be the service controller 118 described above, or another server or computer that is remote from the machine 102 and the service vehicle 104. In other examples, the computing system 400 can be an ECM or other on-board computing system of the machine 102 or the service vehicle 104. In some examples, elements of the computing system 400 can be distributed between the service controller 118, the machine 102, and/or the service vehicle 104. The computing system 400 can include one or more computing devices or other controllers that include one or more processors 402, memory 404, and communication interfaces 406.

The processor(s) 402 can operate to perform a variety of functions as set forth herein. The processor(s) 402 can include one or more chips, microprocessors, application specific integrated circuits (ASICs), field programmable gate arrays (FPGAs) and/or other programmable circuits, central processing units (CPUs), graphics processing units (GPUs), digital signal processors (PSPs), and/or other processing units or components known in the art. In some examples, the processor(s) 402 can have one or more arithmetic logic units (ALUs) that perform arithmetic and logical operations, and/or one or more control units (CUs) that extract instructions and stored content from processor cache memory, and executes such instructions by calling on the ALUs during program execution. The processor(s) 402 can also access content and computer-executable instructions stored in the memory 404, and execute such computer-executable instructions.

The memory 404 can be volatile and/or non-volatile computer-readable media including integrated or removable memory devices including random-access memory (RAM), read-only memory (ROM), flash memory, a hard drive or other disk drives, a memory card, optical storage, magnetic storage, and/or any other computer-readable media. The computer-readable media can be non-transitory computer-readable media. The computer-readable media can be configured to store computer-executable instructions that can be executed by the processor(s) 402 to perform the operations described herein.

For example, the memory 404 can include a drive unit and/or other elements that include machine-readable media. A machine-readable medium can store one or more sets of instructions, such as software or firmware, that embodies any one or more of the methodologies or functions described herein. The instructions can also reside, completely or at least partially, within the processor(s) 402 and/or communication interface(s) 406 during execution thereof by the computing system 400. For example, the processor(s) 402 can possess local memory, which also can store program modules, program data, and/or one or more operating systems.

In some examples, the memory 404 can store a site map 408, a route planner 410, a machine operation determiner 412, and/or other modules and data 414. The site map 408 can indicate terrain of a worksite, and/or obstacles on the worksite. The route planner 410 can be configured to determine the route 214, determine segments 218 of the route 214, determine speeds associated with the segments 218, and/or to perform other operations associated with planning the route 214. The machine operation determiner 412 can determine or predict machine operations of the service vehicle 104 and/or the machine 102 while the machines travel through the route 214, determine or predict energy consumption levels associated with such operations, and/or determine or predict other information associated with machine operations. The other modules and data 414 can be utilized by the computing system 400 to perform or enable performing any action taken by the computing system 400. For example, the other modules and data 414 can include a platform, operating system, and/or applications, as well as data utilized by the platform, operating system, and/or applications.

The communication interfaces 406 can include transceivers, modems, interfaces, antennas, and/or other components that can transmit and/or receive data over networks or other data connections. In some examples, the communication interfaces 406 can be the wireless communication interfaces 116 of the service vehicle 104 or the machine 102 discussed above. In other examples, the communication interfaces 406 can be configured to send data to, and/or receive data from, the wireless communication interfaces 116 of the service vehicle 104 or the machine 102. For instance, in examples in which the computing system 400 is the service controller 118, the computing system 400 can use the communication interfaces 406 to receive location reports, battery SoH reports, and/or other data from the service vehicle 104 and/or the machine 102, send autonomous machine instructions to the service vehicle 104 and/or the machine 102, receive a notification from the machine 102 that requests assistance from the service vehicle 104, send dispatch instructions to the service vehicle 104, send information about the route 214 to the service vehicle 104 and/or the machine 102, receive location information about other machines or personnel on the worksite 200, receive external data, such as data associated with weather conditions on the worksite 200, and/or send or receive any other type of data.

INDUSTRIAL APPLICABILITY

The service vehicle 104 can be dispatched, as described herein, to travel to the machine 102 when the machine 102 is unable to operate based on energy provided by the machine battery 106. For example, the machine 102 may be stranded on the worksite 200 due to a problem that prevents the machine battery 106 from charging or holding a charge, or an electrical issue that prevents the machine battery 106 from providing energy to electrical components of the machine 102. The service vehicle 104 can connect the energy transfer arm 108 to the machine 102, and transfer energy to and/or from the machine 102 via the energy transfer arm 108. For instance, energy from the service vehicle battery 112 can be transferred via the cable 126 of the energy transfer arm 108 to the machine 102, such that the machine 102 can operate based on energy received from the service vehicle battery 112.

The connection between the service vehicle 104 and the machine 102 can, in some examples, allow the service vehicle 104 and the machine 102 to travel together in a convoy formation, while the service vehicle 104 is providing energy to the machine 102. For example, the energy provided by the service vehicle 104 to the machine 102 can enable the machine 102 to travel using an electric drivetrain, electric motor, and/or other electrically-powered components of the machine 102. The service vehicle 104 and the machine 102 can, for instance, travel together in a convoy formation to the maintenance station 208, where maintenance or repair can be performed on the machine 102.

Overall, if the machine 102 becomes fully or partially disabled on a worksite, and is thus stranded on the worksite, the service vehicle 104 can rescue the stranded machine 102 by providing energy that allows the machine 102 to travel to the maintenance station 208. Because an electric drivetrain and/or other electrically-powered components of the machine 102 can operate based on the energy received from the service vehicle 104, the machine 102 can travel to the maintenance station 208 using its own electrically-powered components. Accordingly, a worksite manager can avoid dispatching a tow truck or other type of rescue vehicle that may be configured to use force provided its own drivetrain to pull, or otherwise move, the machine 102 during transport back to the maintenance station 208.

As such, in some examples the service vehicle 104 can be smaller, and/or have less horsepower, than conventional tow trucks or other rescue vehicles. The service vehicle 104 may also experience less strain than tow trucks or other types of rescue vehicles that are configured to pull or otherwise move other vehicles or machines, as the service vehicle 104 and the machine 102 can independently execute driving operations while the service vehicle 104 is providing energy to the machine 102 during convoy travel.

While aspects of the present disclosure have been particularly shown and described with reference to the embodiments above, it will be understood by those skilled in the art that various additional embodiments may be contemplated by the modification of the disclosed machines, systems, and method without departing from the spirit and scope of what is disclosed. Such embodiments should be understood to fall within the scope of the present disclosure as determined based upon the claims and any equivalents thereof.

What is claimed is:

1. A computer-implemented method, comprising:
   receiving, by one or more processors, a notification indicating that a machine is at least partially disabled at a location and is unable to drive using first energy provided by a machine battery of the machine based on, at least one of:
   a battery issue that prevents the machine battery from holding a charge, or
   a charging issue that prevents charging of the machine battery;
   determining, by the one or more processors in response to the notification, a path of a route, the route comprising:
   a first portion extending from a current location of a service vehicle to the location; and
   a second portion extending from the location to a destination, wherein the second portion of the route is to be traveled by the service vehicle and the machine together in a convoy formation;
   instructing, by the one or more processors, the service vehicle to:
   travel to the location via the first portion of the route using operation energy for operating the service vehicle from a first service vehicle battery of the service vehicle;
   attach an energy transfer arm of the service vehicle to an energy transfer port of the machine;
   transfer second energy from a second service vehicle battery of the service vehicle to the machine via the energy transfer arm to enable the machine to move using the second energy while the energy transfer arm is attached to the energy transfer port of the machine, the second service vehicle battery reserved for providing the second energy and separate from the first service vehicle battery, wherein the machine moves in the convoy formation through the second portion of the route using the second energy; and
   travel with the machine, in the convoy formation, through the second portion of the route using the operation energy from the first service vehicle battery while the energy transfer arm is attached to the energy transfer port of the machine and the second energy is transferred via the energy transfer arm from the second service vehicle battery to the machine and used by the machine; and
   cooling a cable, connecting the second service vehicle battery and an energy transfer connector of the energy transfer arm, to maintain temperature of the cable below a threshold temperature.

2. The computer-implemented method of claim 1, further comprising determining, by the one or more processors, that the notification indicates that the machine is able to receive the second energy from the service vehicle and drive using the second energy.

3. The computer-implemented method of claim 1, wherein the notification indicates at least one of:
   the location,
   a position of the energy transfer port on the machine, or
   a type of the energy transfer port.

4. The computer-implemented method of claim 1, wherein the destination is a maintenance station configured to replace the machine battery or repair the machine.

5. The computer-implemented method of claim 1, wherein the path of the route is determined based on one or more of:
   a state of charge of the first service vehicle battery,
   predicted energy consumption levels associated with operations of at least one of the machine or the service vehicle,
   traffic information associated with the route,
   predicted travel times associated with the route,
   terrain features associated with the route, or
   positions of machines, personnel, or obstacles proximate to the route.

6. The computer-implemented method of claim 1, wherein determining the path of the route comprises defining maximum speeds, associated with individual segments of the second portion of the route, based on one or more of:
one or more braking capabilities available to the machine upon a disconnect of the energy transfer arm from the energy transfer port,
a machine weight of the machine,
a payload weight of a payload carried by the machine,
terrain grade angles associated with the individual segments of the route, or
positions, relative to the second portion of the route, of other machines, personnel, or obstacles.

7. The computer-implemented method of claim 1, further comprising causing the service vehicle to:
perform one or more operations to drain a state of charge of the second service vehicle battery during the first portion of the route;
receive third energy, via the energy transfer arm from a regenerative brake system of the machine, during travel through the second portion of the route; and
charge the second service vehicle battery using the third energy.

8. The computer-implemented method of claim 1, further comprising causing the service vehicle to:
arrive at the destination with a state of charge of the first service vehicle battery above a threshold state of charge associated with travel of the service vehicle from the destination to a charging station;
travel, without the machine, from the destination to the charging station; and
charge the first and second service vehicle batteries at the charging station.

9. A service controller associated with a worksite, comprising:
one or more processors; and memory storing computer-executable instructions that, when executed by the one or more processors, cause the one or more processors to perform operations comprising:
receiving a notification indicating that a machine on the worksite is at least partially disabled at a location at the worksite and is unable to drive using first energy provided by a machine battery of the machine based on at least one of:
a battery issue that prevents the machine battery from providing the first energy,
a battery issue that prevents the machine battery from holding a charge, or
a charging issue that prevents charging of the machine battery;
identifying a service vehicle on the worksite that is available to assist the machine, wherein the service vehicle comprises a first service vehicle battery, a second service vehicle battery separate from the first service battery, and an energy transfer arm configured to attach to an energy transfer port of the machine;
generating a route for the service vehicle to travel with the machine, in a convoy formation, through the worksite to a destination;
dispatching the service vehicle to:
travel to the location using operation energy for operating the service vehicle from the first service vehicle battery;
attach the energy transfer arm to the energy transfer port of the machine;
transfer second energy from the second service vehicle battery to the machine via the energy transfer arm to enable the machine to move using the second energy while the energy transfer arm is attached to the energy transfer port of the machine, the second service vehicle battery reserved for providing the second energy, wherein the machine moves in the convoy formation through the route using the second energy; and
travel with the machine, in the convoy formation, through the route using the operation energy from the first service vehicle battery while the energy transfer arm is attached to the energy transfer port of the machine and the second energy is transferred via the energy transfer arm from the second service vehicle battery to the machine; and
cooling a cable, connecting the second service vehicle battery and an energy transfer connector of the energy transfer arm, to maintain temperature of the cable below a threshold temperature.

10. The service controller of claim 9, wherein the destination is a maintenance station configured to replace the machine battery or repair the machine.

11. The service controller of claim 9, wherein the service vehicle is identified, from among a plurality of service vehicles on the worksite, by:
predicting one or more driving operations and one or more machine operations of the service vehicle and the machine during travel through the route,
predicting energy consumption levels of the service vehicle and the machine associated with travel through the route, and
determining that:
a state of charge of the first service vehicle battery is sufficient to power the one or more driving operations and the one or more machine operations of the service vehicle during travel through the route, and
a state of charge of the second service vehicle battery is sufficient to power the one or more driving operations and the one or more machine operations of the machine during travel through the route.

12. The service controller of claim 9, wherein the route is generated based on one or more of:
traffic information associated with the route,
predicted travel times associated with the route,
terrain features associated with the route, or
positions of machines, personnel, or obstacles proximate to the route.

13. The service controller of claim 9, wherein generating the route comprises defining maximum speeds, associated with individual segments of the route, for the convoy formation based on one or more of:
one or more braking capabilities available to the machine upon a disconnect of the energy transfer arm from the energy transfer port,
a machine weight of the machine,
a payload weight of a payload carried by the machine,
terrain grade angles associated with the individual segments of the route, or
positions, relative to a path of the route, of other machines, personnel, or obstacles.

14. The service controller of claim 9, wherein the operations further comprise causing the service vehicle to:
perform one or more machine operations to drain a state of charge of the second service vehicle battery before the service vehicle reaches the location;
receive third energy, via the energy transfer arm from a regenerative brake system of the machine, during travel through the route in the convoy formation; and charge the second service vehicle battery using the third energy.

15. One or more non-transitory computer-readable media storing computer-executable instructions that, when executed by one or more processors, cause the one or more processors to perform operations comprising:
    receiving a notification indicating that a machine on a worksite is at least partially disabled at a location at the worksite and is unable to drive using first energy provided by a machine battery of the machine based on, at a least one of:
        the machine battery being unable to store the first energy, or
        the machine battery being unable to provide the first energy to the machine;
    identifying a service vehicle on the worksite that is available to assist the machine, wherein the service vehicle comprises a first service vehicle battery, a second service vehicle battery separate from the first service vehicle battery, and an energy transfer arm configured to attach to an energy transfer port of the machine;
    determining a path for a route for the service vehicle to travel with the machine, in a convoy formation, through the worksite from the location to a destination at the worksite;
    dispatching the service vehicle to:
        travel to the location using operation energy for operating the service vehicle from the first service vehicle battery;
        attach the energy transfer arm to the energy transfer port of the machine;
        transfer second energy from the second service vehicle battery to the machine via the energy transfer arm to enable the machine to move using the second energy while the energy transfer arm is attached to the energy transfer port of the machine, the second service vehicle battery reserved for providing the second energy, wherein the machine moves in the convoy formation through the route using the second energy; and
        travel with the machine, in the convoy formation, through the route using the operation energy from the first service vehicle battery while the energy transfer arm is attached to the energy transfer port of the machine and the second energy is transferred via the energy transfer arm from the second service vehicle battery to the machine; and
    cooling a cable, connecting the second service vehicle battery and an energy transfer connector of the energy transfer arm, to maintain temperature of the cable below a threshold temperature.

16. The one or more non-transitory computer-readable media of claim 15, wherein the service vehicle is identified, from among a plurality of service vehicles on the worksite, by:
    predicting one or more driving operations and one or more machine operations of the service vehicle and the machine during travel through the route,
    predicting energy consumption levels of the service vehicle and the machine associated with travel through the route, and
    determining that:
        a state of charge of the first service vehicle battery is sufficient to power the one or more driving operations and the one or more machine operations of the service vehicle during travel through the route, and
        a state of charge of the second service vehicle battery is sufficient to power the one or more driving operations and the one or more machine operations of the machine during travel through the route.

17. The one or more non-transitory computer-readable media of claim 15, wherein the path of the route is determined based on one or more of:
    traffic information associated with the route,
    predicted travel times associated with the route,
    terrain features associated with the route, or
    positions of machines, personnel, or obstacles proximate to the route.

18. The one or more non-transitory computer-readable media of claim 15, wherein determining the path of the route comprises defining maximum speeds, associated with individual segments of the route, for the convoy formation based on one or more of:
    one or more braking capabilities available to the machine upon a disconnect of the energy transfer arm from the energy transfer port,
    a machine weight of the machine,
    a payload weight of a payload carried by the machine,
    terrain grade angles associated with the individual segments of the route, or
    positions, relative to the path of the route, of other machines, personnel, or obstacles.

19. The computer-implemented method of claim 1, further comprising:
    enabling data exchange between the service vehicle and the machine via a data transfer cable that extends along the energy transfer arm when the energy transfer arm is connected to the energy transfer port.

* * * * *